(12) United States Patent
Lee et al.

(10) Patent No.: US 10,733,368 B2
(45) Date of Patent: Aug. 4, 2020

(54) METHOD AND SYSTEM FOR PROCESSING MULTI-DIMENSIONAL SPREADSHEET

(71) Applicant: Kang Don Lee, Namyangju-si, Gyeonggi-do (KR)

(72) Inventors: Kang Don Lee, Namyangju-si (KR); Choul Gi Ahn, Namyangju-si (KR)

(73) Assignee: Kang Don Lee, Namyangju-si (KR)

( * ) Notice: Subject to any disclaimer, the term of this patent is extended or adjusted under 35 U.S.C. 154(b) by 0 days.

(21) Appl. No.: 16/057,645

(22) Filed: Aug. 7, 2018

(65) Prior Publication Data

US 2019/0087399 A1   Mar. 21, 2019

(30) Foreign Application Priority Data

Sep. 19, 2017 (KR) .......................... 10-2017-0120331

(51) Int. Cl.
*G06F 17/00* (2019.01)
*G06F 40/18* (2020.01)
*G06F 3/0482* (2013.01)

(52) U.S. Cl.
CPC ............ *G06F 40/18* (2020.01); *G06F 3/0482* (2013.01)

(58) Field of Classification Search
CPC ....... G06F 17/246; G06F 3/0482; G06F 40/18
See application file for complete search history.

(56) References Cited

U.S. PATENT DOCUMENTS

| | | | | |
|---|---|---|---|---|
| 5,033,009 A | * | 7/1991 | Dubnoff ................ | G06F 17/243 715/205 |
| 5,055,998 A | * | 10/1991 | Wright .................... | G06F 9/455 715/201 |
| 5,255,356 A | * | 10/1993 | Michelman ........... | G06F 17/246 715/212 |
| 5,272,628 A | * | 12/1993 | Koss ..................... | G06F 17/246 715/205 |
| 5,276,607 A | * | 1/1994 | Harris ..................... | G06F 17/10 345/467 |

(Continued)

FOREIGN PATENT DOCUMENTS

| | | |
|---|---|---|
| KR | 10-2006-0049240 | 5/2006 |
| KR | 10-2010-0135281 | 12/2010 |

(Continued)

OTHER PUBLICATIONS

Notice of Grounds for Rejection, dated Oct. 22, 2018, for Korean Patent Application No. 10-2017-0120331, with English translation.

(Continued)

*Primary Examiner* — Laurie A Ries
(74) *Attorney, Agent, or Firm* — Weaver Austin Villeneuve & Sampson LLP

(57) ABSTRACT

Provided are a method and a system for processing a multi-dimensional spreadsheet and the method for processing a multi-dimensional spreadsheet includes: receiving a sub-cell creation command for at least one cell among a plurality of cells constituting a spreadsheet; and creating a sub-cell having a tree structure with respect to the at least one cell, in which it is possible to provide a method and a system for processing a multi-dimensional spreadsheet, which can simply configure a table having complicated data through a sub-cell in a multi-dimensional spreadsheet and easily use the table.

17 Claims, 31 Drawing Sheets

(56) References Cited

U.S. PATENT DOCUMENTS

| | | | | |
|---|---|---|---|---|
| 5,317,686 A * | 5/1994 | Salas | G06F 17/246 | 715/212 |
| 5,359,724 A * | 10/1994 | Earle | G06F 12/0207 | |
| 5,572,644 A * | 11/1996 | Liaw | G06F 3/0481 | 715/209 |
| 6,256,649 B1 * | 7/2001 | Mackinlay | G06F 17/246 | 345/473 |
| 6,317,750 B1 * | 11/2001 | Tortolani | G06F 40/18 | |
| 6,707,454 B1 * | 3/2004 | Barg | G06K 9/6253 | 345/440 |
| 7,275,207 B2 * | 9/2007 | Aureglia | G06F 40/18 | 715/214 |
| 8,140,549 B2 * | 3/2012 | Barinaga | G06F 16/9577 | 707/756 |
| 9,298,454 B2 * | 3/2016 | Tuvian | G06F 8/76 | |
| 2001/0007988 A1 * | 7/2001 | Bauchot | G06F 40/18 | |
| 2001/0016855 A1 * | 8/2001 | Hiroshige | G06F 40/18 | 715/227 |
| 2002/0091728 A1 * | 7/2002 | Kjaer | G06F 40/18 | 715/212 |
| 2003/0088586 A1 * | 5/2003 | Fitzpatrick | G06F 16/252 | |
| 2004/0237029 A1 * | 11/2004 | Medicke | G06F 16/283 | 715/213 |
| 2005/0010862 A1 * | 1/2005 | Bauchot | G06F 40/177 | 715/220 |
| 2005/0262087 A1 * | 11/2005 | Wu | G06F 16/21 | |
| 2006/0031187 A1 * | 2/2006 | Pyrce | G06F 3/04815 | |
| 2009/0112922 A1 * | 4/2009 | Barinaga | G06F 16/9577 | |
| 2010/0169759 A1 * | 7/2010 | Le Brazidec | G06Q 10/10 | 715/219 |
| 2010/0185653 A1 * | 7/2010 | Fortuna | G06F 40/14 | 707/769 |
| 2010/0199161 A1 * | 8/2010 | Aureglia | G06F 40/18 | 715/218 |
| 2011/0072340 A1 * | 3/2011 | Miller | G06Q 40/02 | 715/220 |
| 2011/0106795 A1 * | 5/2011 | Maim | G06F 17/2229 | 707/728 |
| 2012/0041733 A1 * | 2/2012 | Brock | G06F 17/5009 | 703/6 |
| 2013/0179772 A1 * | 7/2013 | Nakamura | G06F 40/14 | 715/234 |
| 2013/0298002 A1 * | 11/2013 | Viry | G06F 17/246 | 715/220 |
| 2014/0164896 A1 * | 6/2014 | Schlereth | G06F 17/246 | 715/217 |
| 2017/0199862 A1 * | 7/2017 | Litt | G06F 40/18 | |
| 2018/0150531 A1 * | 5/2018 | Demonsant | G06F 16/284 | |
| 2018/0203838 A1 * | 7/2018 | Hiatt | G06T 11/206 | |

FOREIGN PATENT DOCUMENTS

| | | |
|---|---|---|
| KR | 10-2012-0051070 | 5/2012 |
| KR | 10-1459410 B1 | 11/2014 |

OTHER PUBLICATIONS

Notice of Allowance, dated Mar. 27, 2019, for Korean Patent Application No. 10-2017-0120331, 2 pages (no translation).

* cited by examiner

| | A | B | | C | | D | | E | |
|---|---|---|---|---|---|---|---|---|---|
| 1 | 선수 | 16강 | | 8강 | | 4강 | | 결승 | |
| 2 | 성명 | 헤드 | 점수 순위 | 헤드 | 점수 순위 | 헤드 | 점수 순위 | 헤드 | 점수 순위 |
| 3 | 이소라 | 한국 | 합계 118 1 | | | | | 합계 | 118 1 |
| 4 | 박남주 | 한국 | 합계 113 5 | 합계 | 116 1 | 합계 | 117 1 | 합계 | 117 2 |
| 5 | 김고은 | 미국 | 합계 116 2 | 합계 | 115 2 | 합계 | 117 2 | | |
| 6 | 김고일 | 한국 | 합계 115 4 | 합계 | 114 4 | 합계 | 114 3 | | |
| 7 | 이미현 | 일본 | 합계 107 8 | 합계 | 111 5 | | | | |
| 8 | 이야후 | 한국 | 합계 109 6 | 합계 | 109 6 | | | | |
| 9 | 표범일 | 중국 | 합계 109 6 | 합계 | 104 7 | | | | |
| 10 | 당인 | 중국 | 합계 106 9 | 합계 | 100 | | | | |
| 11 | 투후 | 중국 | 합계 105 10 | | | | | | |
| 12 | 조려영 | 미국 | 합계 103 11 | | | | | | |
| 13 | 심디 | 일본 | 합계 99 12 | | | | | | |
| 14 | 코하비 | 미국 | 합계 99 12 | | | | | | |
| 15 | 이안다 | 미국 | 합계 98 14 | | | | | | |
| 16 | 유리아 | 일본 | 합계 97 15 | | | | | | |
| 17 | 카나미 | 미국 | 합계 94 16 | | | | | | |
| 18 | 카르힘 | 미국 | | | | | | | |
| 19 | | | | | | | | | |
| 20 | | | | | | | | | |

FIG. 12C

METHOD AND SYSTEM FOR PROCESSING MULTI-DIMENSIONAL SPREADSHEET

CROSS-REFERENCE TO RELATED APPLICATIONS

This application claims the priority of Korean Patent Application No. 10-2017-0120331 filed on 2017 Sep. 19, in the Korean Intellectual Property Office, the disclosure of which is incorporated herein by reference.

BACKGROUND

Field

The present disclosure relates to a method and a system for processing a multi-dimensional spreadsheet, and more particularly, to a method and a system for processing a multi-dimensional spreadsheet capable of simply configuring and easily using a table having complex data by sub-cells in a multi-dimensional spreadsheet document.

Description of the Related Art

Recently, various types of documents have been created more easily and efficiently through various document creation programs since computer-based document processing has become commonplace. In particular, specialized document creation programs are used in accordance with the purpose and contents of the document. For example, a spreadsheet document creation program, such as Microsoft's "Excel", provides a variety of functions to easily organize large amounts of numeric data, such as accounting books, and to easily calculate the numeric data.

A spreadsheet document consists of two-dimensional coordinates of rows (x-axis) and columns (y-axis). At this time, the spreadsheet document is configured so that one sheet includes a plurality of cells, and a user inputs desired data for each cell, thereby providing quick calculation processing.

However, in the currently used spreadsheet document creation program, the spreadsheet is programmed to recognize one row as one record and one column as one field. Accordingly, there is a case where it is difficult to apply various functions of a spreadsheet program or functions associated with other document creation programs in a spreadsheet document in which tables having a plurality of records and fields are formed.

In addition, in order to organize the data of a plurality of items from a spreadsheet document into a single table, it is necessary to separately create tables in a plurality of sheets, organize them into a new sheet and group them, or use a pivot table function. It is difficult for the unskilled person of the sheet program to use. In addition, there is still the inconvenience that fields of a table composed of multiple/multi-stages cannot be multiplexed and grouped.

Therefore, there is a need to recognize multi-row records and multi-column fields so as for users who are not skilled in the spreadsheet program to easily create multi/multi-tier tables and easily handle complex calculations and to perform functions such as a filter, mail merge, and a pivot table in the multi/multi-tier tables.

SUMMARY

An object of the present disclosure is to provide a method and a system for processing a multi-dimensional spreadsheet document, which can overcome a limitation of a spreadsheet program that recognizes only one-row records and one-column fields and can be intuitively used easily and conveniently by a user.

Another object of the present disclosure is to provide a method and a system for processing a multi-dimensional spreadsheet document, which create a sub-cell having a tree structure with respect to at least one cell among a plurality of cells constituting a spreadsheet to recognize multiple multi-dimensional fields as one field.

Yet another object of the present disclosure is to provide a method and a system for processing a multi-dimensional spreadsheet document, which group sub-cells of a tree structure created in a spreadsheet to simply concatenate and manage tables having complicated data.

Still yet another object of the present disclosure is to provide a method and a system for processing a multi-dimensional spreadsheet document, which control an input for an empty space created as the sub-cell having the tree structure is created with respect to at least one cell among the plurality of cells constituting the spreadsheet to apply various functions of a document creation program, which include partial sum, mail merge, or pivot table.

Objects of the present disclosure are not limited to the above-mentioned objects, and other objects, which are not mentioned above, can be clearly understood by those skilled in the art from the following descriptions.

According to an aspect of the present disclosure, there is provided a method for processing a multi-dimensional spreadsheet includes: receiving a sub-cell creation command for at least one cell among a plurality of cells constituting a spreadsheet; and creating a sub-cell having a tree structure with respect to the at least one cell.

The spreadsheet may be constituted by a plurality of columns and a plurality of rows, and the sub-cell is defined to be located on a different axis from the plurality of columns and the plurality of rows to be disposed in a different dimension.

The receiving of the sub-cell creation command may include receiving an input of the sub-cell creation function for the at least one cell.

The sub-cell creation function may be constituted by a function name, an axial direction parameter in which the sub-cell is created, a sub-row number parameter, and a sub-column number parameter.

The sub-cell creation function may be configured to further include an additional cell number parameter additionally created in a row direction with respect to the created sub-cell.

The sub-cell creation function may be configured to further include a function data parameter indicating data to be input into the sub-cell.

The receiving of the sub-cell creation command further may include receiving a menu input corresponding to the at least one sub-cell.

The receiving of the sub-cell creation command may further include receiving a menu input for selecting the plurality of cells to intend to create the sub-cell having the tree structure and setting the selected cells as multiple fields.

The receiving of the sub-cell creation command may further include creating a sub sheet window for the at least one cell.

The sub sheet window may be a window that displays the sub-cell for the at least one cell apart from the spreadsheet.

The method for processing a multi-dimensional spreadsheet may include controlling an input of the same row as the sub-cell.

The controlling of the input of the same row as the sub-cell may be prohibiting an input for a cell disposed in the same row as the sub-cell.

The method for processing a multi-dimensional spreadsheet may include displaying control for the input of the same row as the sub-cell having the tree structure.

The prohibiting of the input for the cell disposed in the same row as the sub-cell may include displaying a content that the input for the cell disposed in the same row as the sub-cell is prohibited.

According to an another aspect of the present disclosure, there is provided a computer-readable recording medium storing commands providing a method for processing a multi-dimensional spreadsheet includes: receiving a sub-cell creation command for at least one cell among a plurality of cells constituting a spreadsheet; and creating a sub-cell having a tree structure with respect to the at least one cell.

According to an another aspect of the present disclosure, there is provided a system for processing a multi-dimensional spreadsheet includes: a receiving unit receiving a sub-cell creation command for at least one cell among a plurality of cells constituting a spreadsheet; and a processing unit creating a sub-cell having a tree structure with respect to the at least one cell according to the sub-cell creation command.

The receiving unit may receive an input of a sub-cell creation function for the at least one cell.

The receiving unit may further include receiving a menu input corresponding to the at least one sub-cell.

The receiving unit may further receive a signal for controlling an input of the same row as the sub-cell.

Other detailed matters of the exemplary embodiments are included in the detailed description and the drawings.

According to the present disclosure, it is possible to provide a method and a system for processing a multi-dimensional spreadsheet document, which can overcome a limitation of a spreadsheet program that recognizes only one-row records and one-column fields and can be intuitively used easily and conveniently by a user.

According to the present disclosure, it is possible to provide a method and a system for processing a multi-dimensional spreadsheet document, which create a sub-cell having a tree structure with respect to at least one cell among a plurality of cells constituting a spreadsheet to recognize multiple multi-dimensional fields as one field.

According to the present disclosure, it is possible to provide a method and a system for processing a multi-dimensional spreadsheet document, which group sub-cells of a tree structure created in a spreadsheet to simply concatenate and manage tables having complicated data.

According to the present disclosure, it is possible to provide a method and a system for processing a multi-dimensional spreadsheet document, which control an input for an empty space created as the sub-cell having the tree structure is created with respect to at least one cell among the plurality of cells constituting the spreadsheet to apply various functions of a document creation program, which include partial sum, mail merge, or pivot table.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which:

Figure 1A:
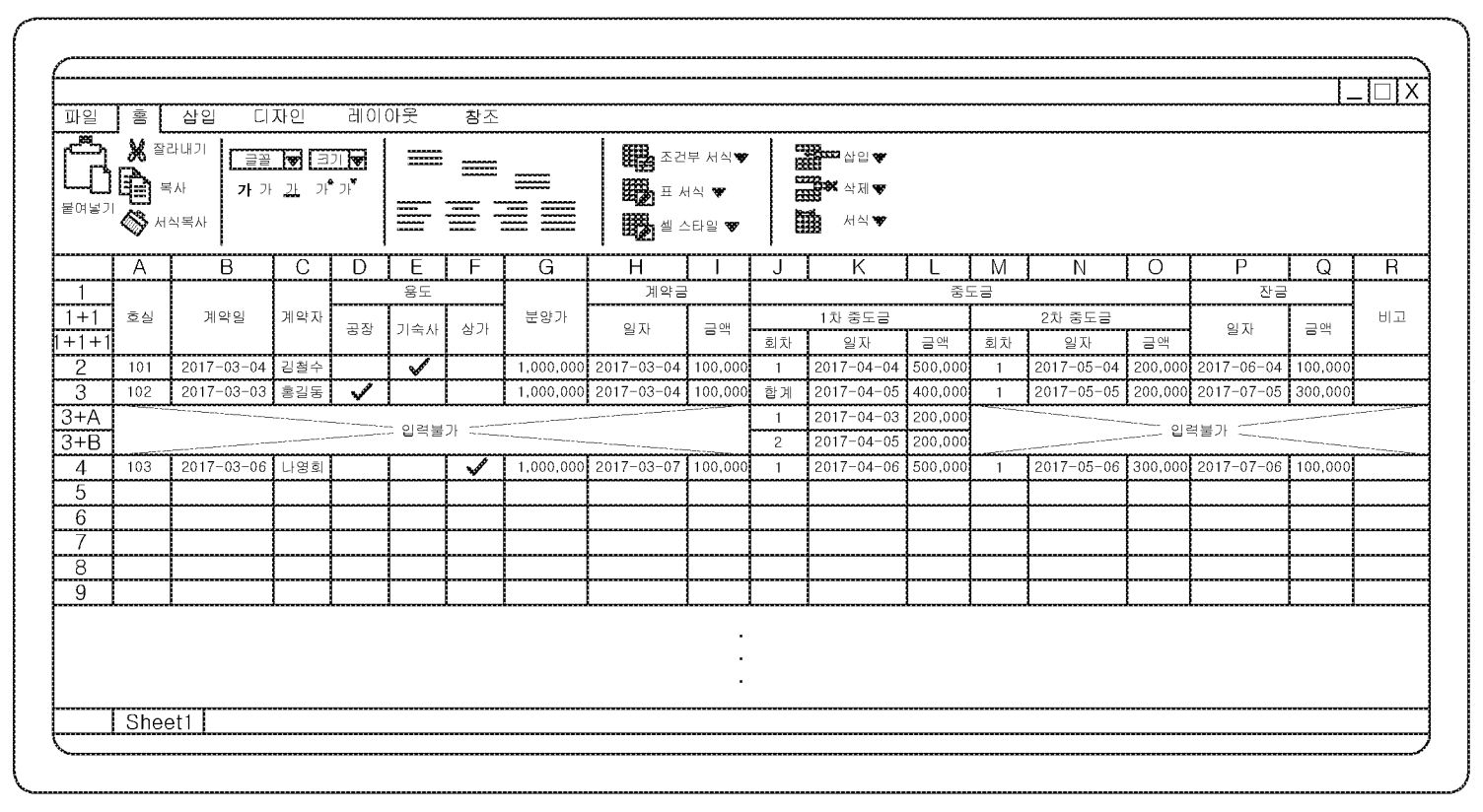

FIG. 1A illustrates an exemplary output screen of a multi-dimensional spreadsheet created by a method and a system for processing a multi-dimensional spreadsheet according to an embodiment of the present disclosure;

FIGS. 4A to 4G exemplarily illustrate a process of creating a table of contents according to the method and the system for processing the multi-dimensional spreadsheet according to the embodiment of the present disclosure;

FIGS. 5A to 5F exemplarily illustrate a process of creating sub-cells for the table of contents according to the method and the system for processing the multi-dimensional spreadsheet according to the embodiment of the present disclosure;

FIGS. 6A and 6B exemplarily illustrate a process of creating sub-cells according to a method and a system for processing a multi-dimensional spreadsheet according to another embodiment of the present disclosure;

FIGS. 7A and 7B exemplarily illustrate a process of creating sub-cells according to a method and a system for processing a multi-dimensional spreadsheet according to yet another embodiment of the present disclosure;

FIGS. 8A and 8B exemplarily illustrate a process of creating sub-cells according to a method and a system for processing a multi-dimensional spreadsheet according to still another embodiment of the present disclosure;

FIGS. 9A and 9B exemplarily illustrate a spreadsheet according to the related art;

FIG. 10A exemplarily illustrates a spreadsheet according to the related art;

FIG. 10B exemplarily illustrates the spreadsheet created according to the method and the system for processing the multi-dimensional spreadsheet according to the embodiment of the present disclosure;

FIG. 11A exemplarily illustrates a spreadsheet according to the related art;

FIG. 12A exemplarily illustrates a sub sheet window created according to the method and the system for processing the multi-dimensional spreadsheet according to the embodiment of the present disclosure; and FIGS. 12B and 12C exemplarily illustrate a process of setting a multiple field according to a method and a system for processing a multi-dimensional spreadsheet according to yet another embodiment of the present disclosure.

DETAILED DESCRIPTION OF THE EMBODIMENT

Figure 1B:
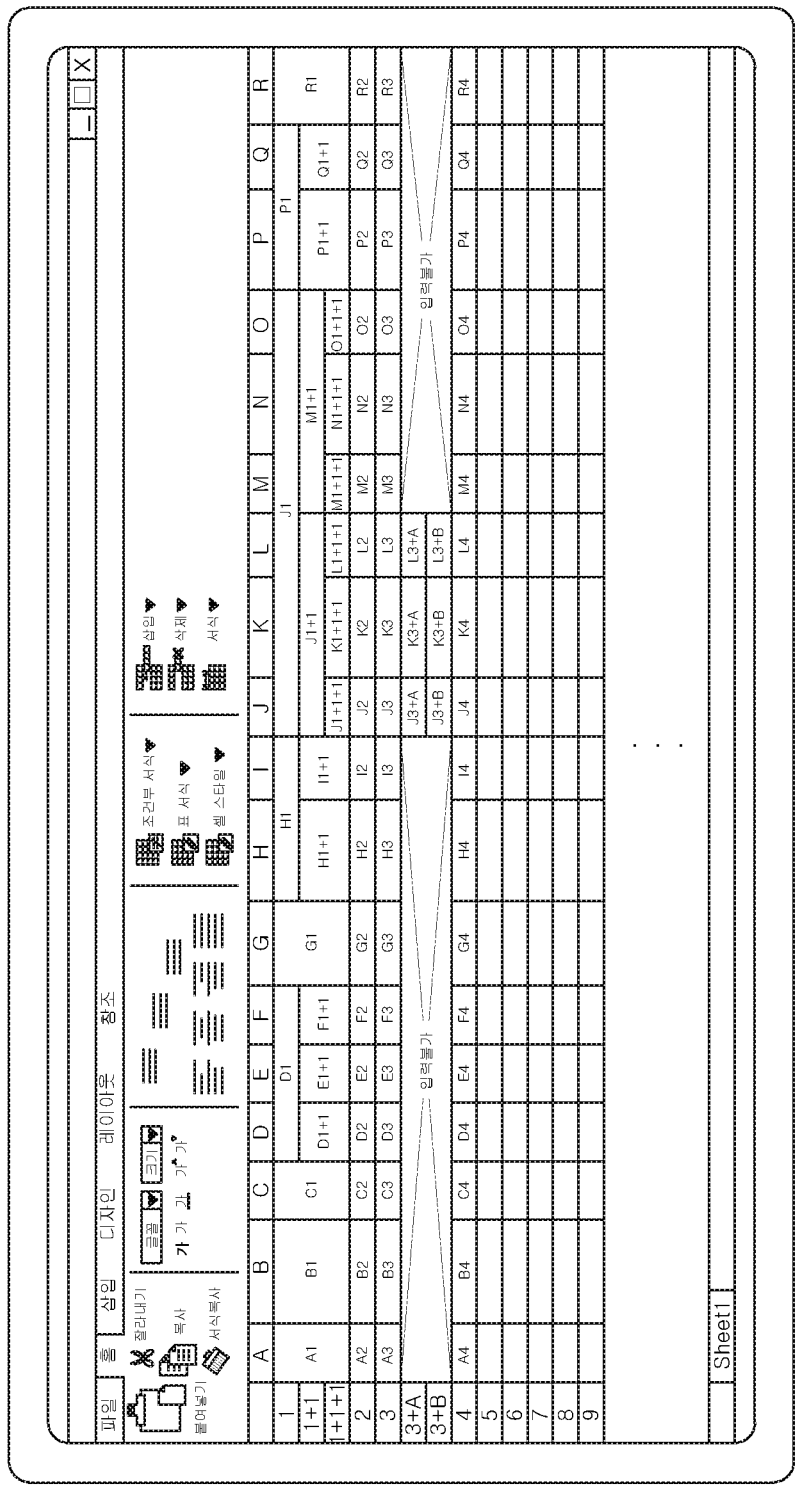
FIG. 1B exemplarily illustrates an algorithm of a multi-dimensional spreadsheet created by a method and a system for processing a multi-dimensional spreadsheet according to an embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a system according to exemplary embodiments of the present disclosure will be described in detail with reference to accompanying drawings.

FIG. 1A illustrates an exemplary output screen of a multi-dimensional spreadsheet created by a method and a system for processing a multi-dimensional spreadsheet according to an embodiment of the present disclosure. FIG. 1B exemplarily illustrates an algorithm of a multi-dimensional spreadsheet created by a method and a system for processing a multi-dimensional spreadsheet according to an embodiment of the present disclosure. FIG. 1A shows a state in which an actual data value is input to a multi-dimensional spreadsheet, and FIG. 1B shows only a cell number excluding a data value input to the multi-dimensional spreadsheet.

Referring to FIGS. 1A and 1B, a multi-dimensional spreadsheet is constituted by a plurality of rows and a plurality of columns. Here, the plurality of rows may be constituted by a plurality of sub-rows, and the plurality of columns may be constituted by a plurality of sub-columns.

In the related art, in order to arrange rows of the spreadsheet sequentially from 1, to constitute dependent rows for one row, the data is input to the second row located below the first row, and thus each of the fields configured as described above is recognized as a separate field, as a result, there was a difficulty in applying a document creation function such as filtering, sorting, partial sum, pivoting, and mail merging.

In the multi-dimensional spreadsheet created by the method and the system 100 for processing the multi-dimensional spreadsheet according to the embodiment of the present disclosure, rows of the spreadsheet are sequentially arranged from 1, and when sub-cells depending on a specific cell are created, the row in which the sub-cell is created is indicated as being dependent on the row number of the specific cell without being indicated as the next row number or the previous row number of the row number of the specific cell. For example, as illustrated in FIGS. 1A and 1B, when a sub-cell "factory", "dormitory", or "shop" for a cell D1 indicating "usage" is created, it can be seen that the row number corresponding to the sub-cell is denoted by 1+1 rather than 2, and the "factory", "dormitory", or "shop" are dependent to "usage". However, the present disclosure is not limited thereto, and the sub-cell dependency may be represented by a combination of numbers and characters, such as rows 3+A and 3+B illustrated in FIGS. 1A and 1B.

Here, a sub-cell means a lower cell of a tree structure for one cell, and means one or more cells that are created dependently on one cell. For example, referring to FIG. 1A and FIG. 1B, a D1+1 cell of "factory", an E1+1 cell of "dormitory", and an F1+1 cell of "shop" configured as lower cells of a D1 cell indicating "usage" may be referred to as sub-cells of the cell D1 that indicates "usage". For example, referring to FIGS. 1A and 1B, a J3+A cell of "first round of the first middle payment", and a J3+B cell of "second round of the first middle payment" configured as lower cells of a J3 cell indicating "sum of the first middle payment" may be referred to as sub-cells of the J3 cell indicating the "sum" of the first middle payment.

Referring to FIGS. 1A and 1B, in a multi-dimensional spreadsheet created by a method and a system 100 for processing the multi-dimensional spreadsheet according to an embodiment of the present disclosure, if necessary, it is possible to control the input of a cell located at the same row as the sub-cells and located in a left or right direction. At this time, for example, the fact that the input to the cell is prohibited may be displayed to a user through a "no input" indication. Thus, the sub-cells may be recognized as separate sheets and do not affect the cells that are adjacent to the sub-cells. As such, by not recognizing the cells processed as "no input" as data, there is an advantageous effect that a document creating function such as a filter, a partial sum, a mail merge, and a pivot table can be used.

Hereinafter, a process of creating the multi-dimensional spreadsheet illustrated in FIGS. 1A and 1B by the method and the system 100 for processing the multi-dimensional spreadsheet according to the embodiment of the present disclosure will be described in more detail with reference to FIGS. 2 to 5G.

Figure 2:
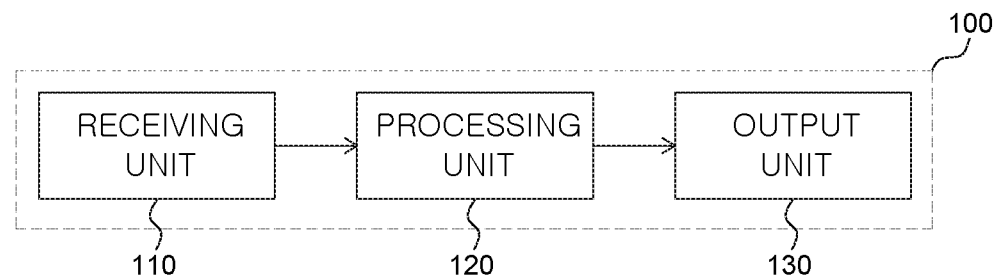
FIG. 2 is a schematic diagram of a system for processing the multi-dimensional spreadsheet according to the embodiment of the present disclosure.
Figure 3:
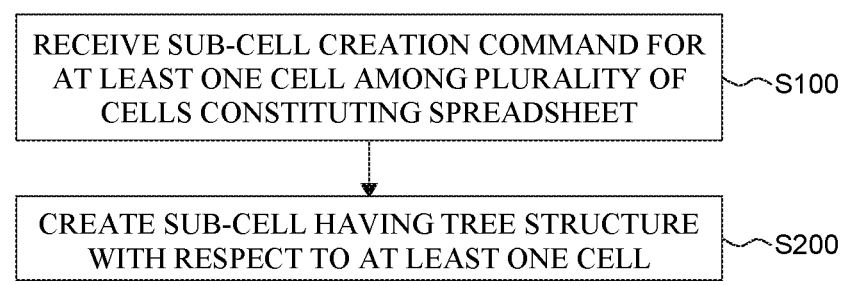
FIG. 3 is a flowchart for describing a method for processing the multi-dimensional spreadsheet according to the embodiment of the present disclosure.
Figure 4A:
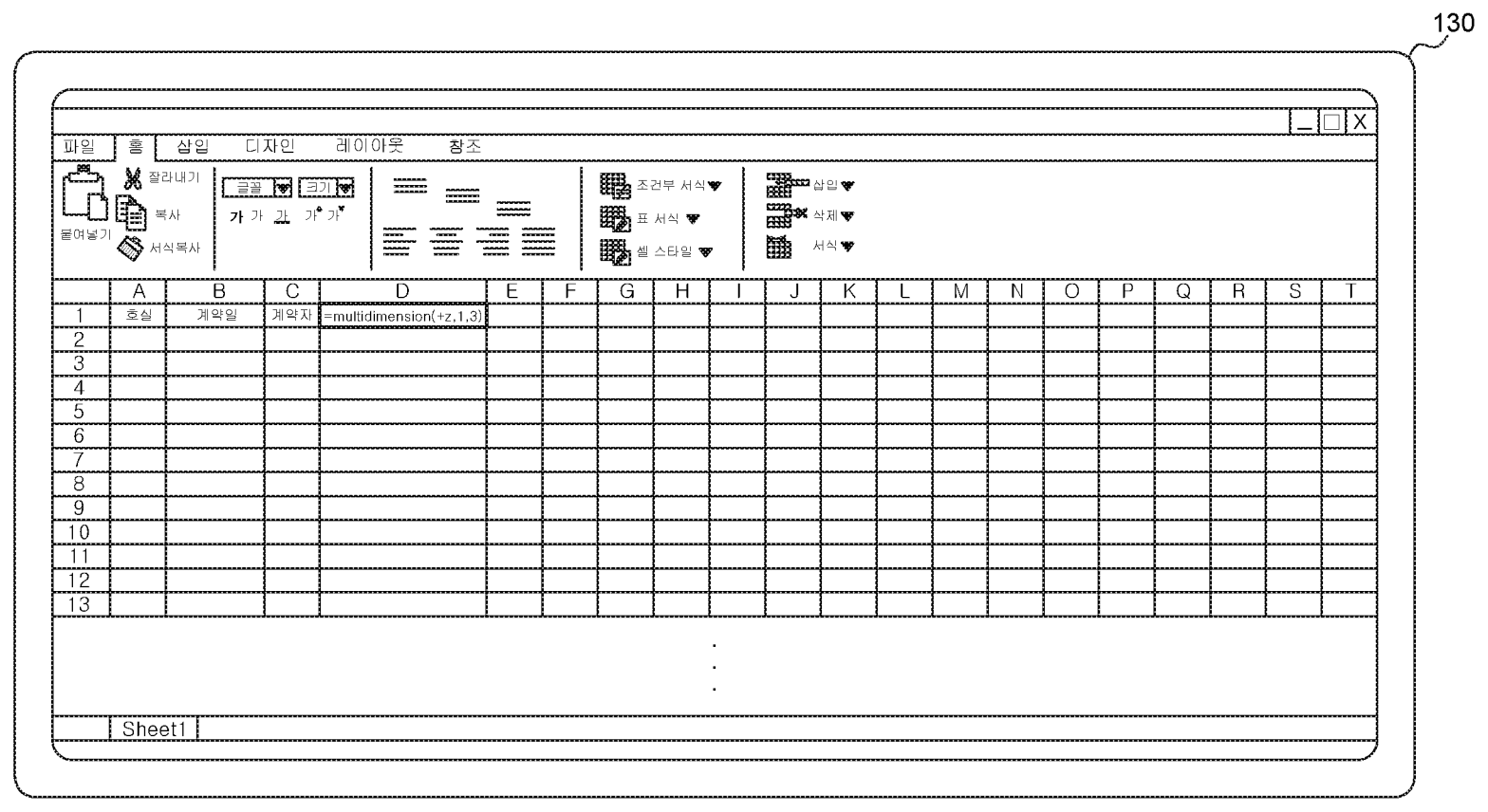
Figure 4B:
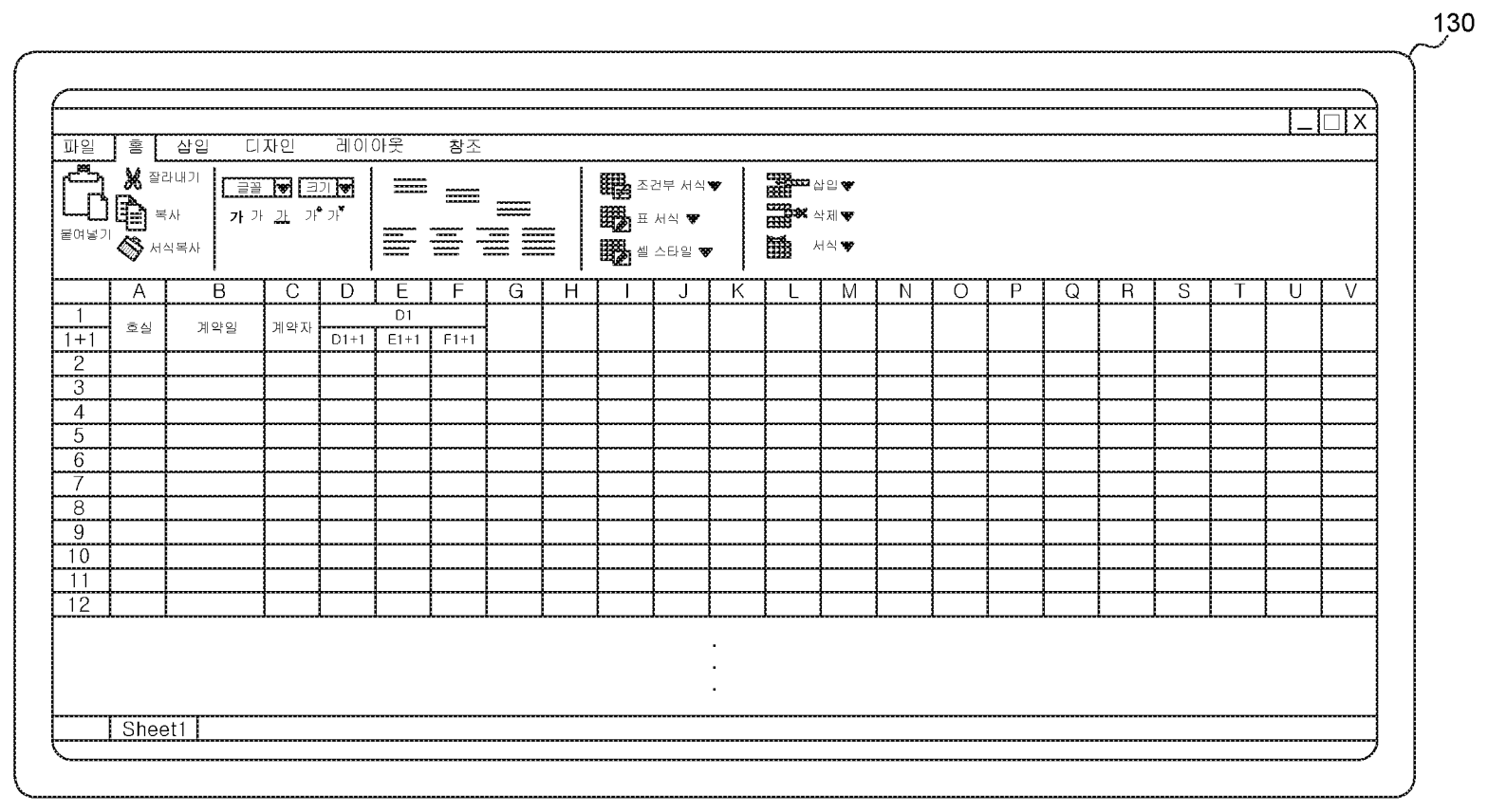
Figure 4C:
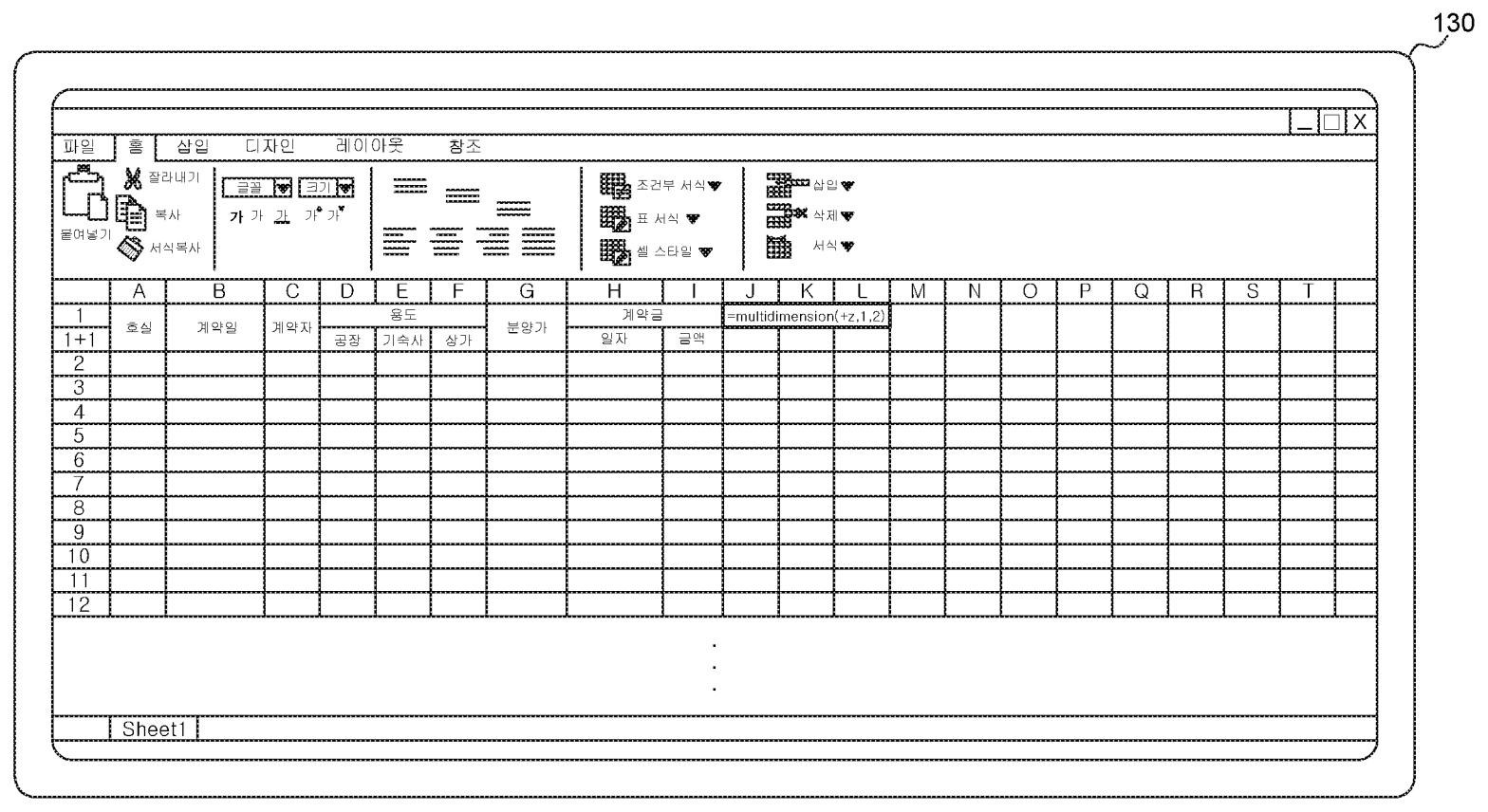
Figure 4D:
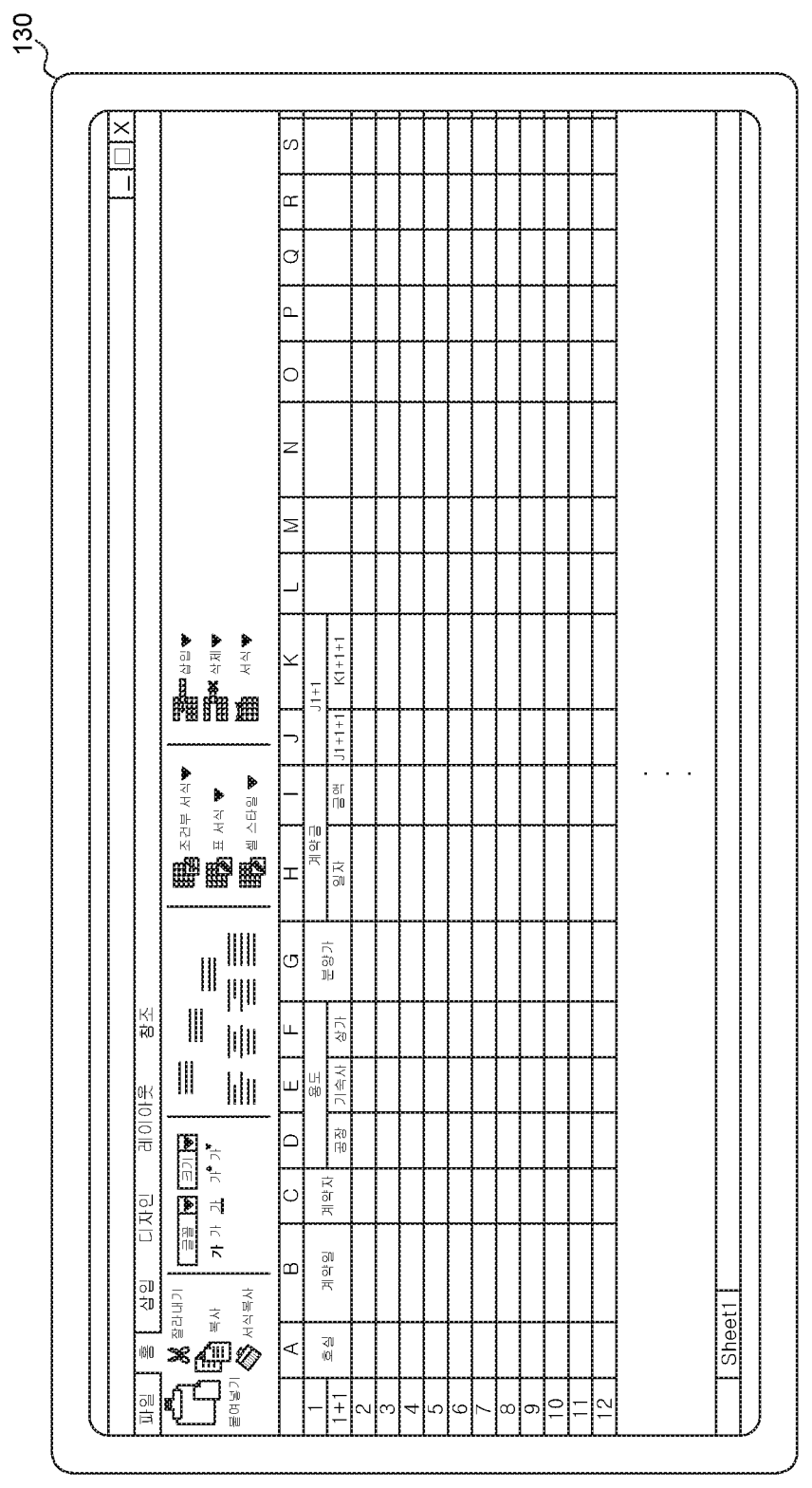
Figure 4E:
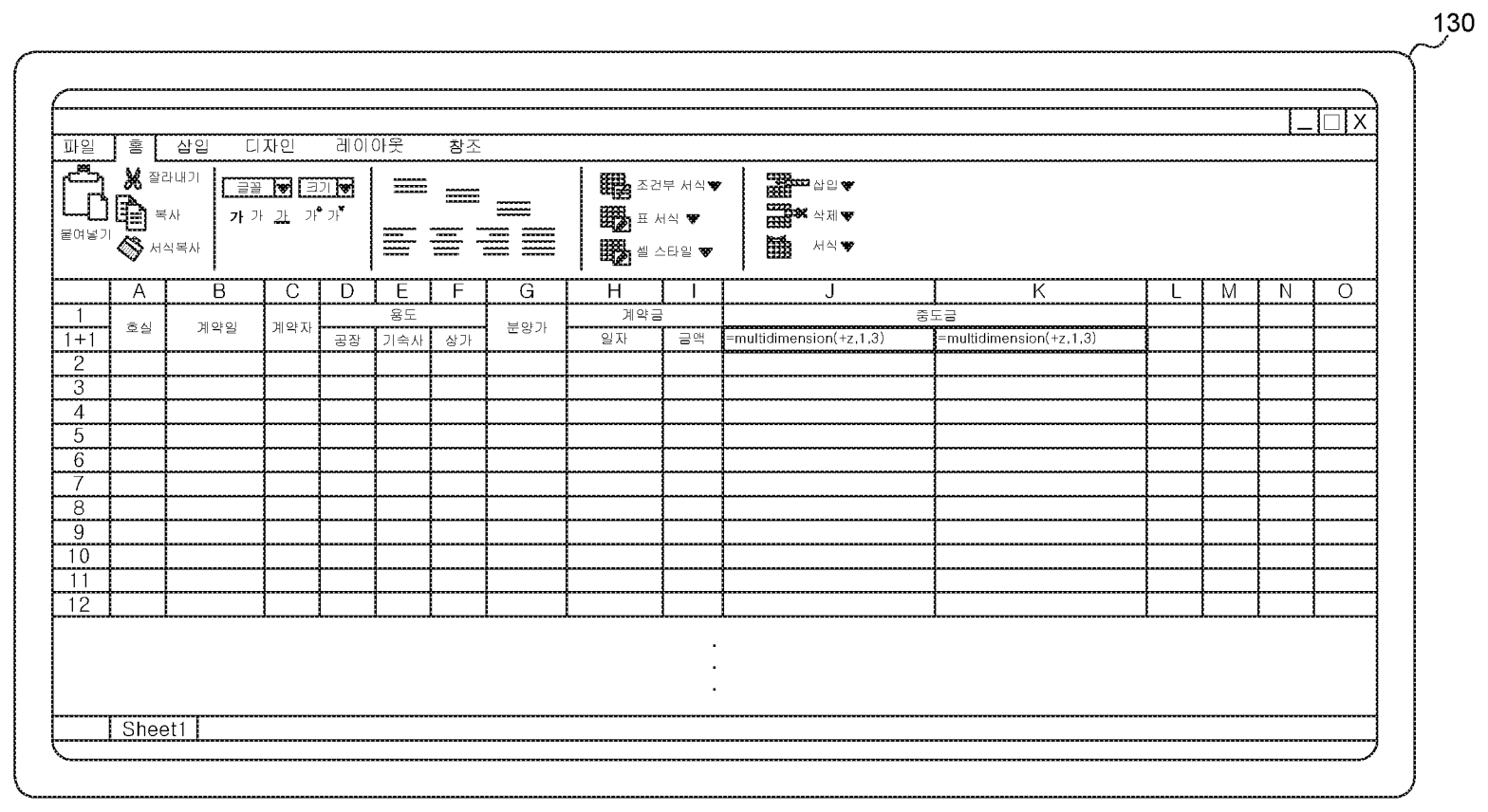
Figure 4F:
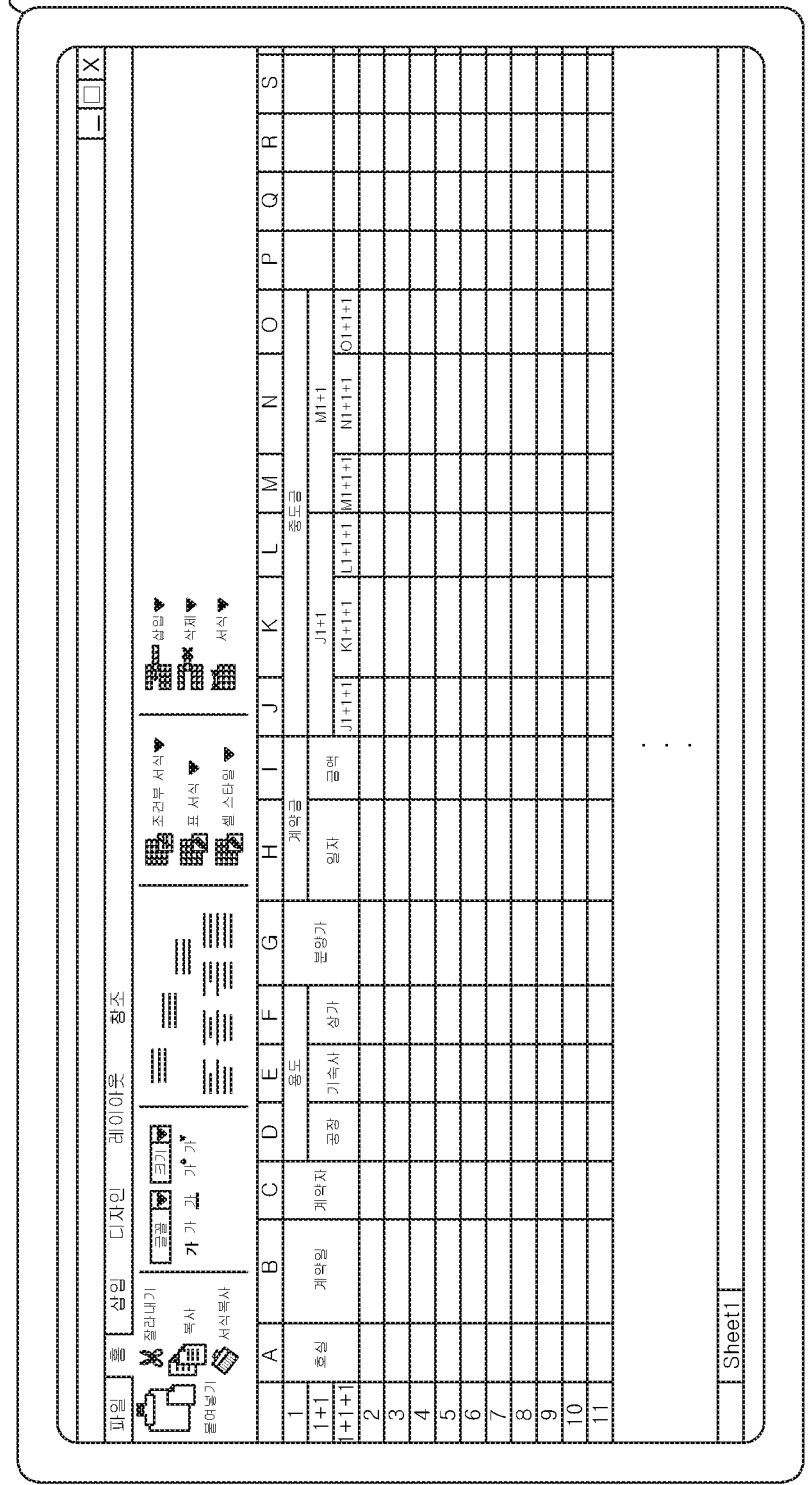

FIG. 2 is a schematic diagram of a system for processing the multi-dimensional spreadsheet according to the embodiment of the present disclosure. FIG. 3 is a flowchart for describing a method for processing the multi-dimensional spreadsheet according to the embodiment of the present disclosure. FIGS. 4A to 4G exemplarily illustrate a process of creating a table of contents according to the method and the system for processing the multi-dimensional spreadsheet according to the embodiment of the present disclosure. FIGS. 5A to 5G exemplarily illustrate a process of creating sub-cells for the table of contents according to the method and the system for processing the multi-dimensional spreadsheet according to the embodiment of the present disclosure.

Referring to FIG. 2, the system 100 for processing the multi-dimensional spreadsheet includes a receiving unit 110, a processing unit 120, and an output unit 130.

The system 100 for processing the multi-dimensional spreadsheet is a system capable of driving a document creation program such as a spreadsheet program. The system 100 for processing the multi-dimensional spreadsheet may be various electronic devices such as, for example, a computer, a smart phone, and a tablet PC, but is not limited thereto.

First, the receiving unit 110 receives a sub-cell creation command for at least one cell of a plurality of cells constituting the spreadsheet (S100).

The receiving unit 110 is a component for receiving a user input in the system 100 for processing the multi-dimensional spreadsheet. The receiving unit 110 may be configured by various input devices such as, for example, a keyboard, a mouse, and a touch screen, but is not limited thereto.

Referring to FIG. 4A, the receiving unit 110 receives a sub-cell creation command for at least one sub-cell of a plurality of cells constituting a spreadsheet document. Here, the sub-cell creation command is a command for creating sub-cell in any one of the plurality of cells constituting the spreadsheet document. For example, the sub-cell creation command may be a command for inputting a function required for creating sub-cells of a tree structure in a cell in the spreadsheet document, or a command for inputting the function through a menu for creating the sub-cells. In FIG. 4A, it is assumed that the sub-cell creation command is an input of the sub-cell creation function.

When the sub-cell creation command is the input of the sub-cell creation function, the sub-cell creation function may be configured by a function name, an axial direction parameter, a sub-row number parameter, and a sub-column number parameter. Here, the function name refers to the name of a function to be inputted to create the sub-cells, and the axial direction parameter refers to a parameter for indicating that the sub-cells are created in an axis different from an x-axis and a y-axis in the spreadsheet document constituted by the row (x-axis) and the column (y-axis). The sub-row number parameter refers to a parameter for inputting how many sub-rows are to be created in the axial direction set by the axial direction parameter, and the sub-column number parameter refers to a parameter for inputting how many columns for sub-rows created corresponding to the sub-row number parameter are divided into. Here, the axial direction parameter may be configured by a sign such as "+" and "−" and an axis name such as "z", where "+" means a positive direction and "−" means a negative direction. For example, referring to FIG. 4A, it is assumed that "multi-dimension" as the function name, "+z" as the axial direction parameter, "1" as the sub-row number parameter and "3" as the sub-column number parameter are inputted.

Meanwhile, the output unit 130 is a component that outputs an image in the system 100 for processing the multi-dimensional spreadsheet. The output unit 130 displays a spreadsheet, as illustrated in FIG. 4A. The output unit 130 may be, for example, a monitor, a TV, or the like, but is not limited thereto.

Subsequently, the receiving unit 110 transmits the sub-cell creation command to the processing unit 120.

The processing unit 120 is a component for processing various data and commands in the system 100 for processing the multi-dimensional spreadsheet. The processing unit 120 may be, for example, a processor of various electronic devices, but is not limited thereto.

Subsequently, the processing unit 120 creates a sub-cell of a tree structure for at least one cell of the plurality of cells constituting the spreadsheet based on the sub-cell creation command (S200).

Referring to FIG. 4B, the processing unit 120 creates sub-cells of a tree structure for at least one cell based on the received sub-cell creation command. Specifically, the processing unit 120 may create sub-cells based on a sub-cell creation function for a cell to which the sub-cell creation command is input to create a spreadsheet document having multi-dimensional attributes. As described above, when "+z" as the axial direction parameter, "1" as the sub-row number parameter, and "3" as the sub-column number parameter are input, as illustrated in FIG. 4B, one sub-row, 1+1 row is created and three sub-columns are created in a downward direction of the D1 cell, that is, in a positive direction and three sub-cells of D1+1, E1+1, and F1+1 for the D1 cell are created.

Subsequently, referring to FIGS. 4C and 4G, a table of contents for the spreadsheet document having the multi-dimensional attributes is completed through the sub-cell creation command and the data input for the cell of the user.

As illustrated in FIG. 4C, the "apartment price" is input to a G1 cell, "date" and the "amount", which are sub-cells for a H1 cell indicating "down payment", are created, and then "=multidimension(+z, 1, 2)" may be input to a J1 cell as the sub-cell creation function.

In this case, as illustrated in FIG. 4D, sub-cells "J1+1" and "K1+1" for the J1 cell are created.

Subsequently, as illustrated in FIG. 4E, when "=multidimension(+z, 1, 3)" is input to the sub-cells "J1+1" and "K1+1" for the "J1" indicating the middle payment, respectively, sub-cells for the sub-cells "J1+1" and "K1+1" may be created, respectively.

Specifically, referring to FIG. 4, sub-cells "J1+1+1", "K1+1+1", and "L1+1+1", which are sub-cells for a sub-cell "J1+1", are created, and sub-cells "M1+1+1", "N1+1+1", and "O1+1+1", which are sub-cells for a sub-cell "M1+1", may be created. As such, as the additional sub-cells are created, a sub-row "1+1+1" may also be created.

Figure 4G:
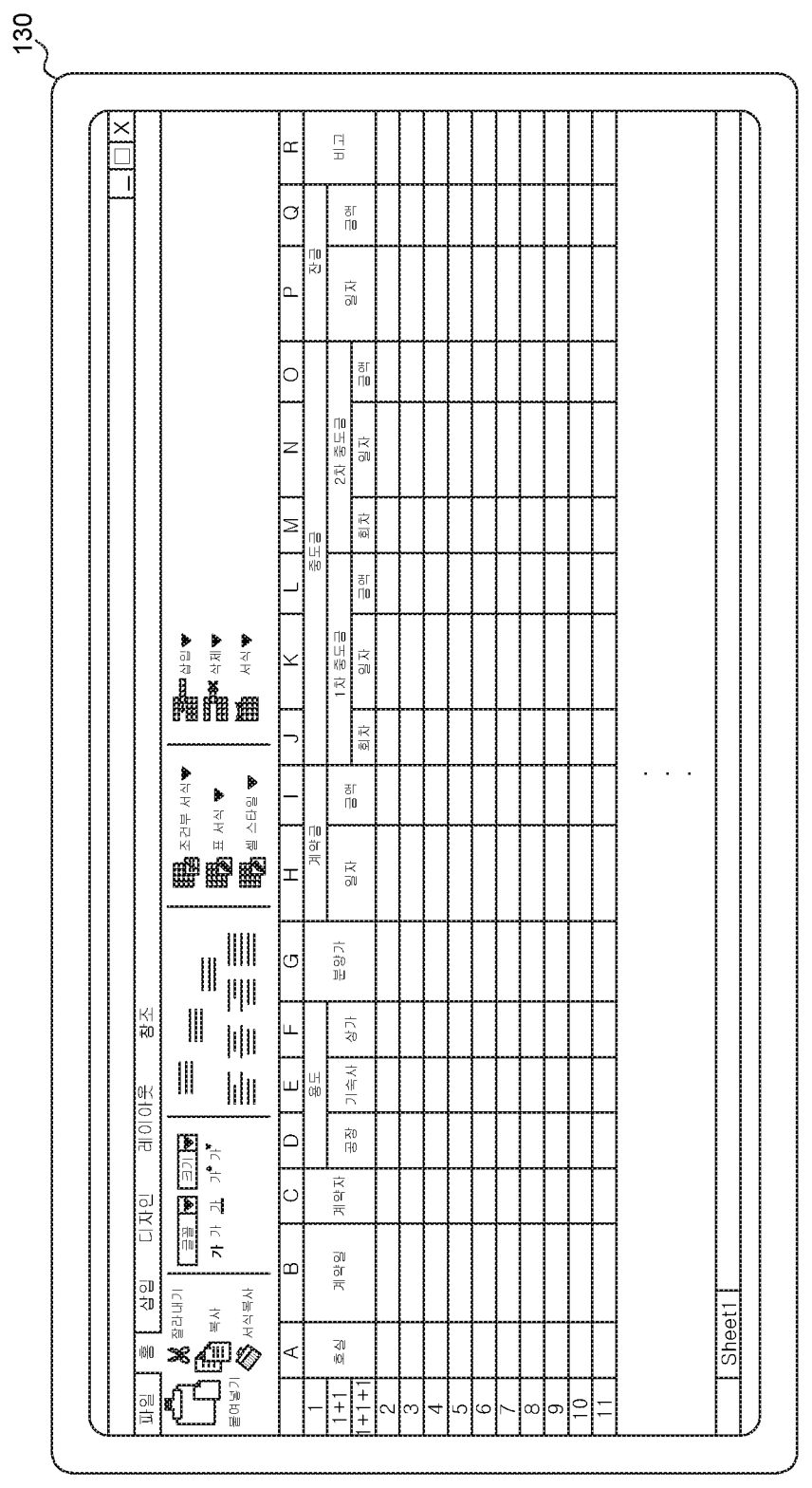

Thereafter, as all the data input by the user is completed, the table of contents of the spreadsheet in the state illustrated in FIG. 4G may be created.

Figure 5A:
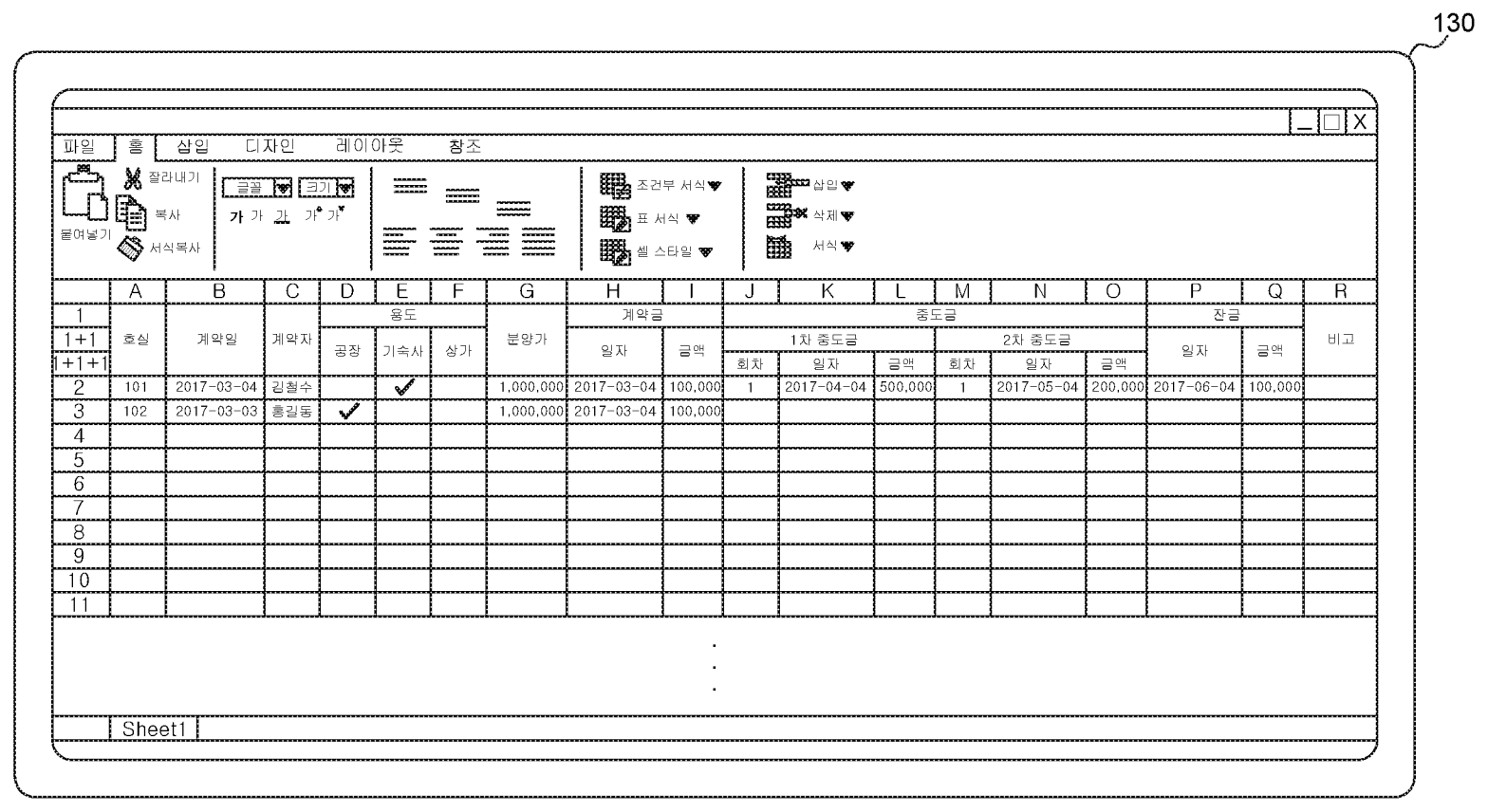

Then, as illustrated in FIG. 5A, data on the completed table of contents may be sequentially input.

Figure 5B:
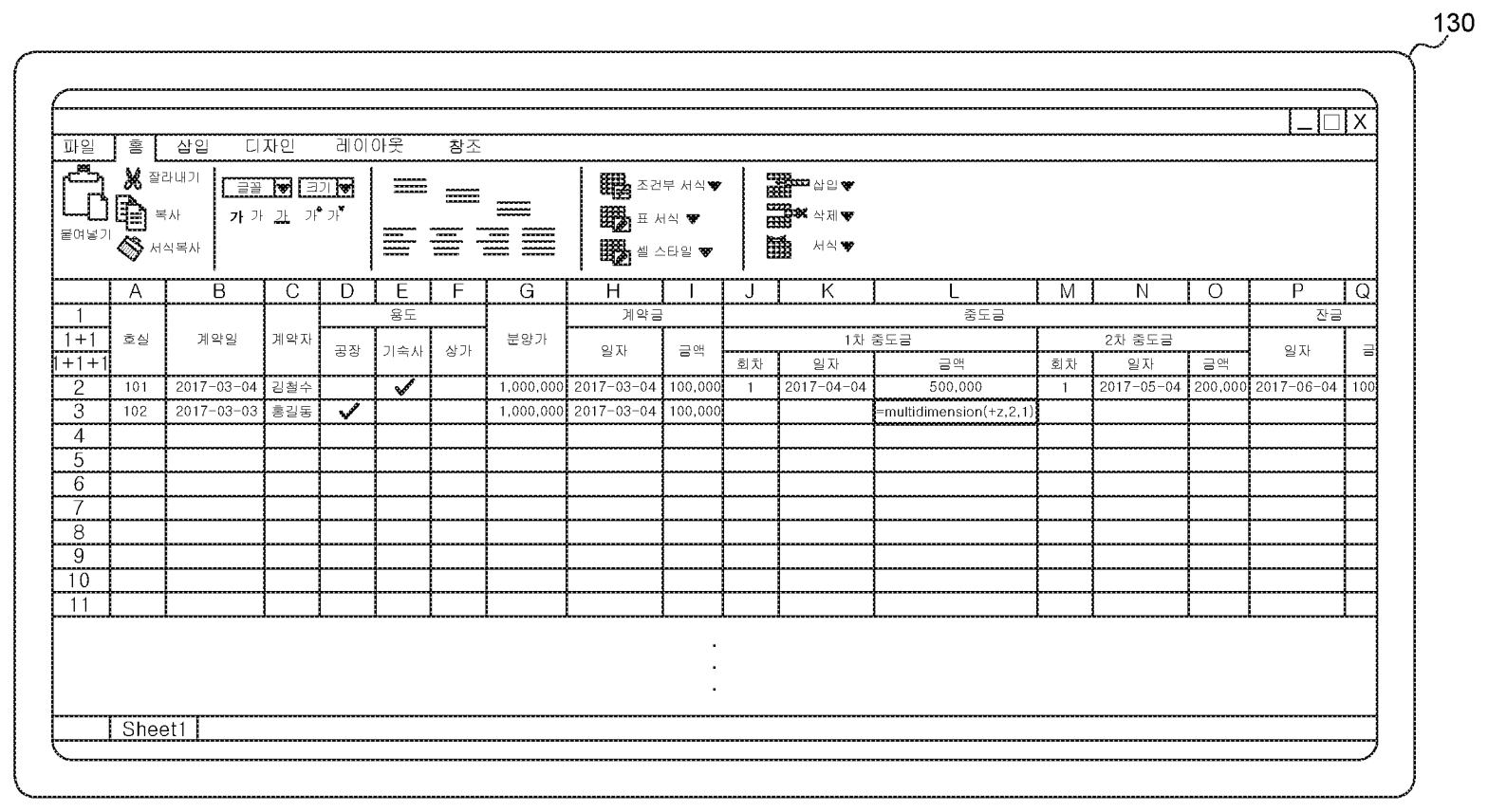

As illustrated in 5A, after the data on the down payment for a contractor "Gil-Dong, Hong" is completed, in order to create sub-cells for the first down payment of "Gil-Dong, Hong", the sub-cell creation function illustrated in FIG. 5B may be input.

Figure 5C:
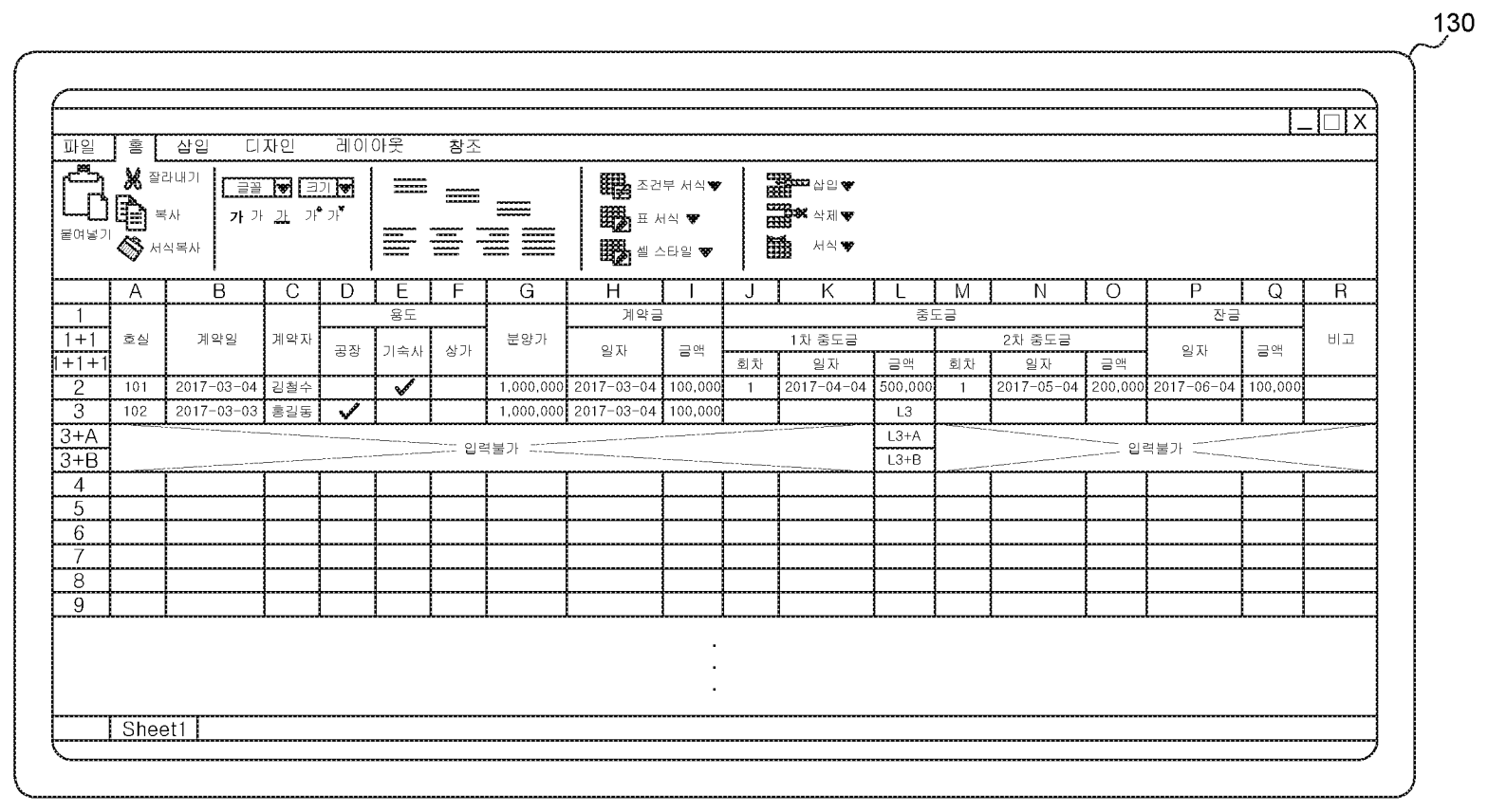

Specifically, as illustrated in FIG. 5B, when "=multidimension(+z, 2, 1)" is input to a cell "L3" corresponding to the amount of the first middle payment as a sub-cell creation function, as illustrated in FIG. 5C, sub-cells "L3+A" and "L3+B" may be created.

Referring to FIG. 5C, the processing unit 120 may control the input of the same row as the created sub-cell. Specifically, the processing unit 120 may prohibit an input to cells arranged in the same row as the sub-cell. For example, as illustrated in FIG. 5C, when the sub-cells "L3+A" and "L3+B" are created, an input for cells arranged in the same row as the created sub-cells "L3+A" and "L3+B", that is, cells arranged at left and right sides may be prohibited. Therefore, sub-cells of a tree structure are dependent on an upper cell and have different depths.

At this time, the processing unit 120 may display the control on the input of the same row as the sub-cells of the tree structure through the output unit 130. That is, as illustrated in FIG. 5C, the processing unit 120 may display contents that an input for the cell arranged on the same row as the sub-cell is prohibited, for example, characters such as "No input" and a sign "X" on an input prohibited part.

Figure 5D:
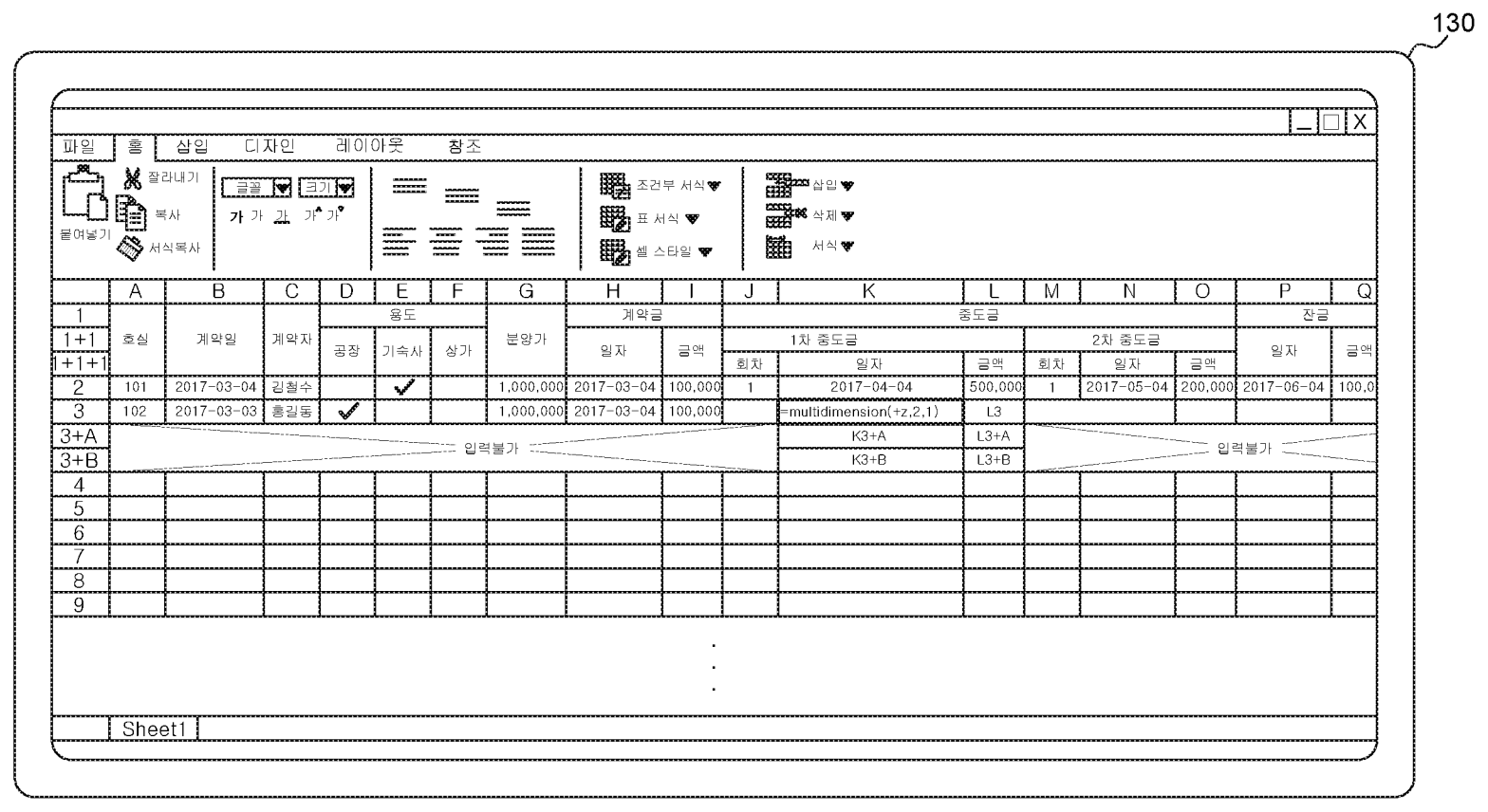

Subsequently, referring to FIG. 5D, when a function having the same form as the sub-cell creation function input to the L3 cell in FIG. 5B is input to a K3 cell, sub-cells "K3+A" and "K3+B" for the K3 cell may be created. In addition, although not illustrated, when a function having the same form as the sub-cell creation function input to the L3 cell in FIG. 5B is input even to a J3 cell, sub-cells "J3+A" and "J3+B" for the J3 cell may be created.

Figure 5E:
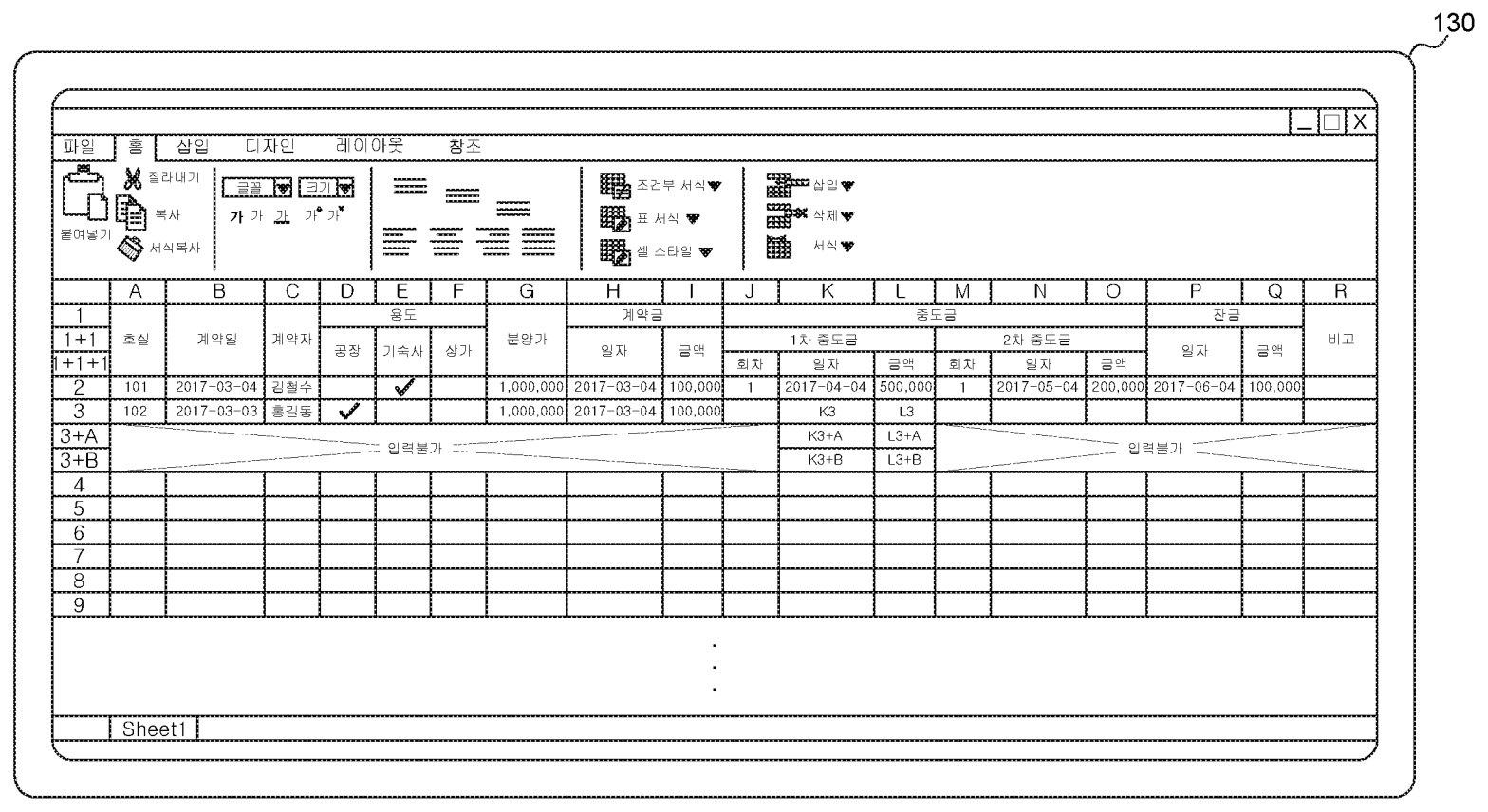

Subsequently, referring to FIG. 5E, it can be seen that the sub-cells "L3+A" and "L3+B", the sub-cells "K3+A" and "K3+B", and the sub-cells "J3+A" and "J3+B" for the J3 cell, the K3 cell, and L3 cell are created, respectively, and the input is controlled to be prohibited with respect to the same row as the aforementioned sub-cell.

Figure 5F:
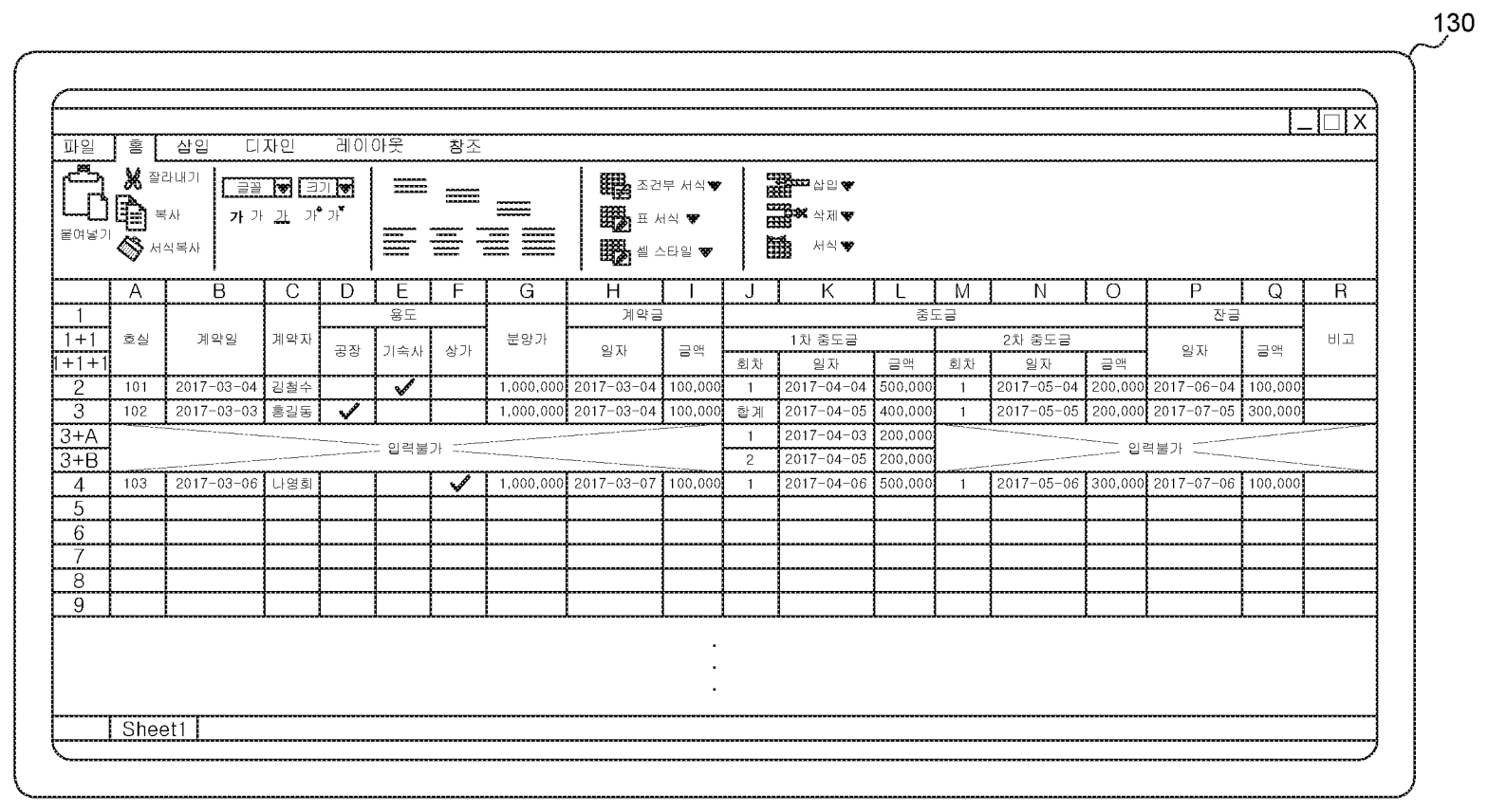

Thereafter, when the user completes the data input, a spreadsheet in a final state illustrated in FIGS. 1A and 5F may be completed.

In the method and system 100 for processing the multi-dimensional spreadsheet according to the embodiment of the present disclosure, the created sub-cells are recognized as a separate lower cell from the upper cell existing in the spreadsheet. As a result, it is advantageous to apply commands of a document creation program such as a function of designating a range to parameters such as a filter, a pivot table, a mail merge, a partial sum, a sort, and a rank function. Particularly, modifications are possible so as to use the multi-dimensional spreadsheet in conjunction with other programs such as a mail merge function of a word processor.

In addition, the method and the system 100 for processing the multi-dimensional spreadsheet may be configured to select a cell to create sub-cells among the plurality of cells constituting the spreadsheet, receive the sub-cell creation command input to the selected cell, and then display and output a multi-column field in a sub-cell form. Accordingly, in the method and the system 100 for processing the multi-dimensional spreadsheet, a user may easily display complex data in one table, easily perform complicated calculations, and use the data by interlocking with other programs.

Figure 6A:
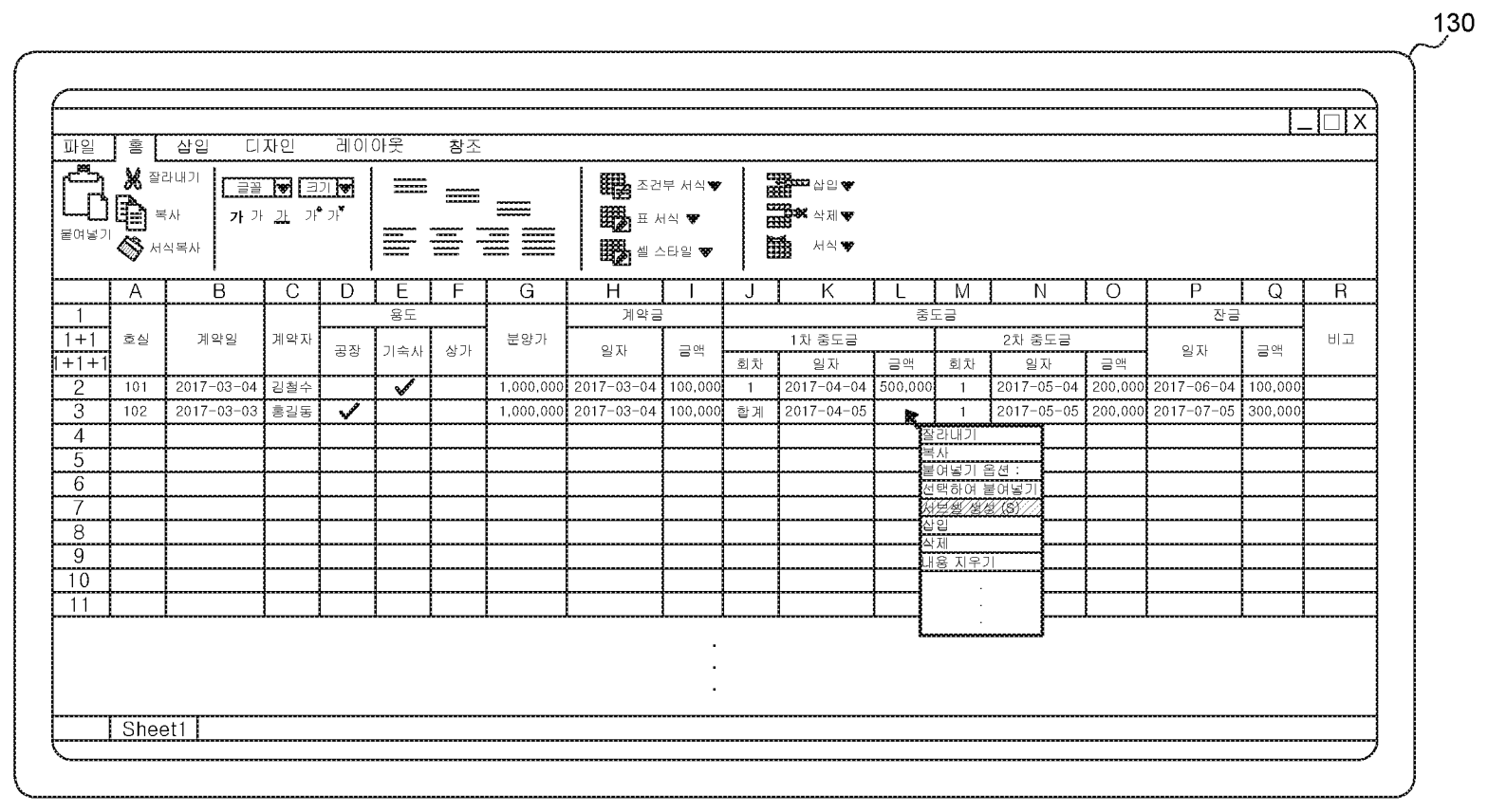
Figure 6B:
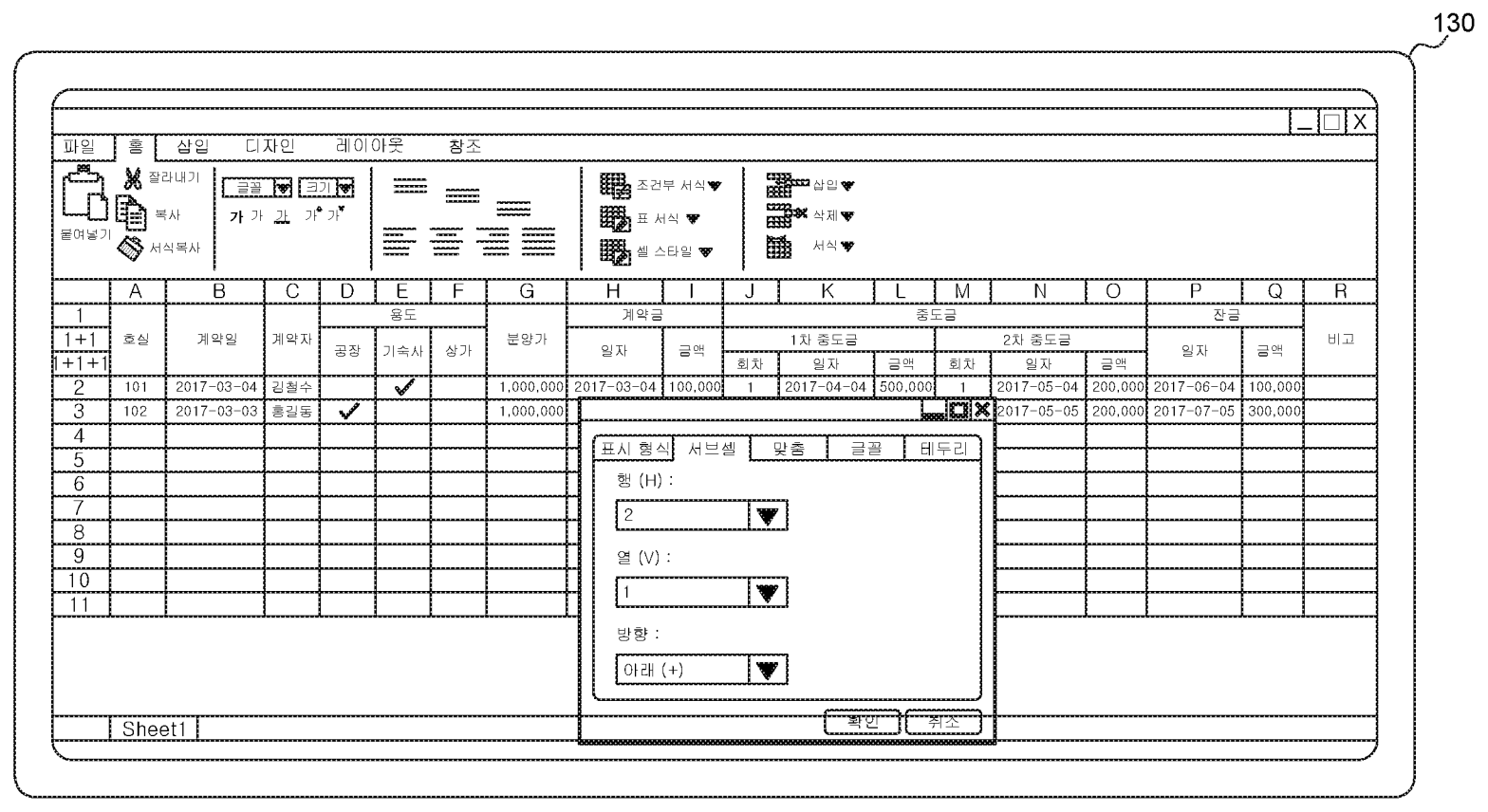

FIGS. 6A and 6B exemplarily illustrate a process of creating sub-cells according to a method and a system for processing a multi-dimensional spreadsheet according to another embodiment of the present disclosure. In the embodiment illustrated in FIGS. 6A and 6B, since a sub-cell creation command is substantially the same as that of the embodiment described with reference to FIGS. 2 to 5F only except that the sub-cell creation command is a menu input, the duplicated description will be omitted.

Referring to FIG. 6A, the receiving unit 110 may receive a menu input corresponding to at least one sub-cell. Specifically, as illustrated in FIG. 6A, the receiving unit 110 may receive a sub-cell creation command by a user's menu input on a spreadsheet. For example, the user may call a menu window for the L3 cell by inputting, for example, a right-click with respect to the L3 cell of the spreadsheet and input the sub-cell creation command by selecting a "sub-cell creation (s)" menu with respect to the called menu window. Subsequently, as illustrated in FIG. 6B, the number of rows H, the number of columns V, and directions of the sub-cells to be created may be set in a sub-cell creation window displayed in response to the sub-cell creation menu selection.

Figure 7A:
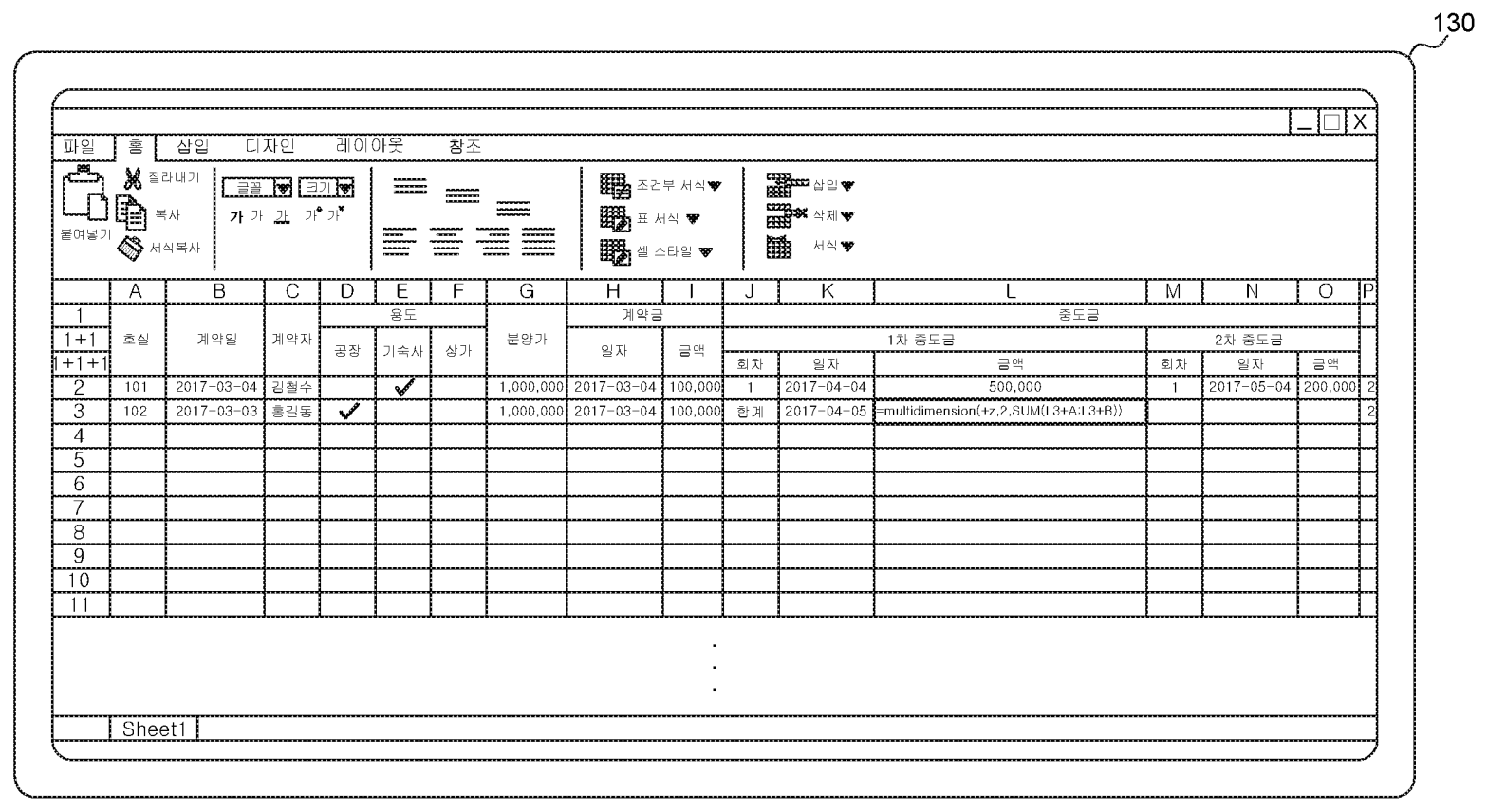
Figure 7B:
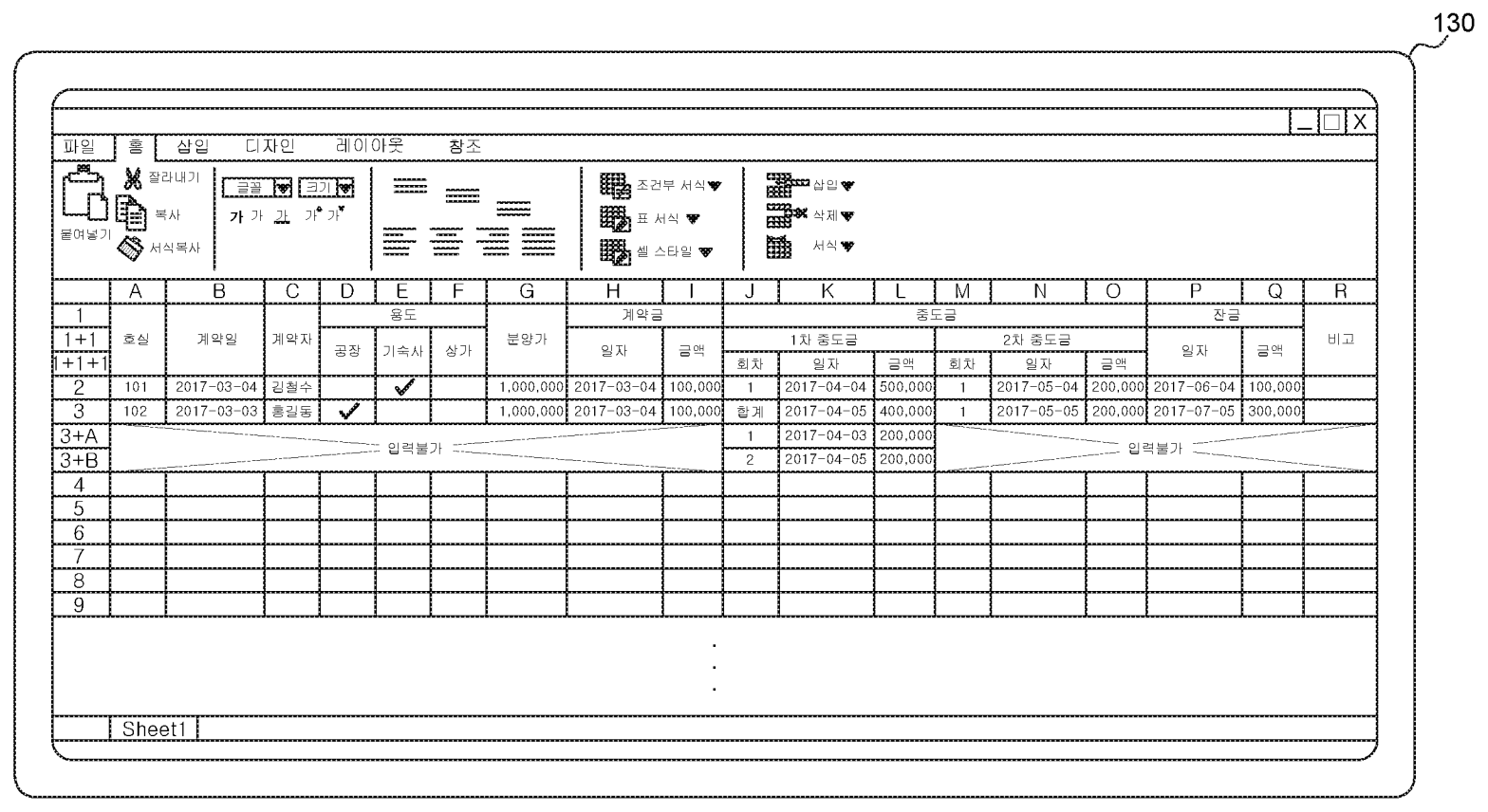

FIGS. 7A and 7B exemplarily illustrate a process of creating sub-cells according to a method and a system for processing a multi-dimensional spreadsheet according to yet another embodiment of the present disclosure. In the embodiment illustrated in FIGS. 7A and 7B, since a sub-cell creation command is substantially the same as that of the embodiment described with reference to FIGS. 2 to 5F only except that a parameter for a sub-cell creation function used as a sub-cell creation command is added, the duplicated description will be omitted.

Referring to FIG. 7A, the sub-cell creation function may further include a function data parameter indicating data to be input. Specifically, when a function name of the sub-cell creation function input to the L3 cell is "multidimension", an axis direction parameter is "+z", the sub-row number parameter is "2", the sub-column number parameter is "1", and a function data parameter is "SUM(L3+A:L3+B)", even if no data is input to the L3 cell as illustrated in FIG. 7B, a sum of input values of the sub-cells "L3+A" and "L3+B" created for the L3 cell is displayed. Here, the function data parameter is not limited to the "SUM" function, and various function expressions may be included.

Figure 8A:
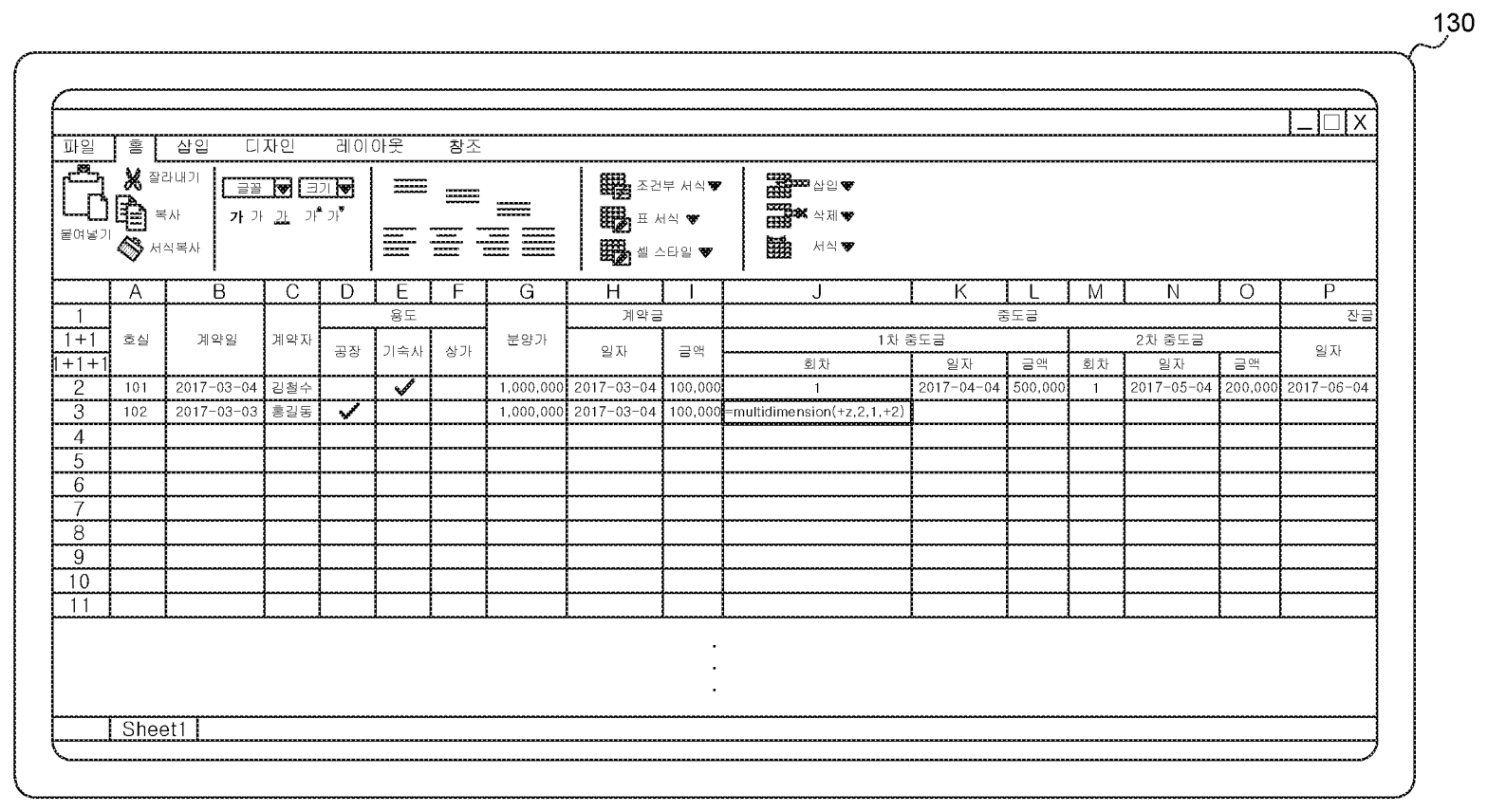
Figure 8B:
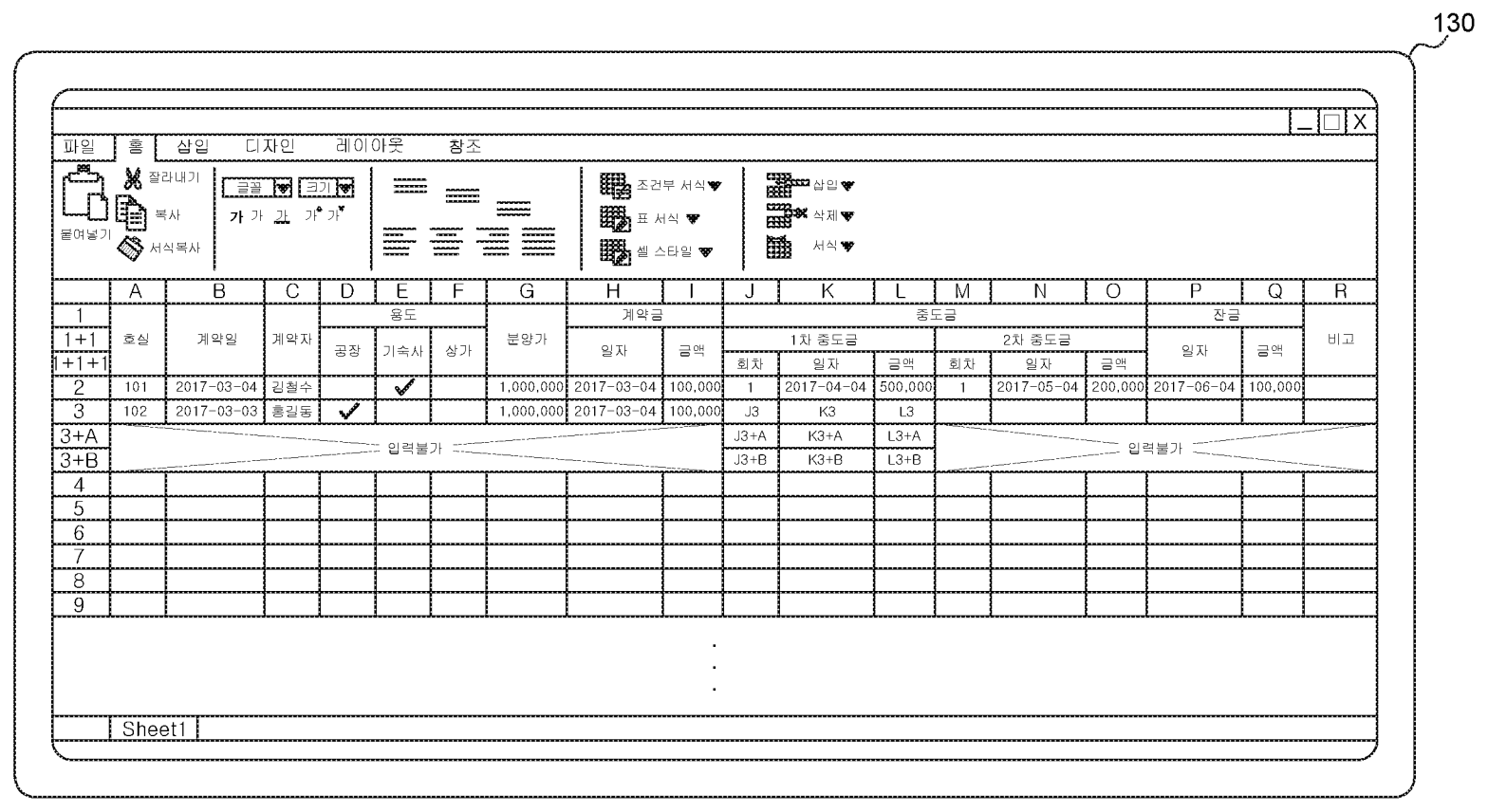

FIGS. 8A and 8B exemplarily illustrate a process of creating sub-cells according to a method and a system for processing a multi-dimensional spreadsheet according to still another embodiment of the present disclosure. In the embodiment illustrated in FIGS. 8A and 8B, since a sub-cell creation command is substantially the same as that of the embodiment described with reference to FIGS. 2 to 5F only except that a parameter for a sub-cell creation function used as a sub-cell creation command is added, the duplicated description will be omitted.

Referring to FIG. 8A, the sub-cell creation function may further include an additional cell number parameter that is additionally created in a row direction with respect to the created sub-cell. Specifically, referring to FIG. 8A, a function name of a sub-cell creation function input to a J1 cell is "multidimension", an axis direction parameter of "+z", a sub-row number parameter of "2", a sub-column number parameter of "1" and an additional cell number parameter of "+2" are input. In this case, since the sub-cells "J3+A" and "J3+B" are created in two rows and one column in the downward direction based on the J1 cell and the additional cell number parameter is "+2", as illustrated in FIG. 8B, sub-cells "K3+A", "K3+B", "L3+A", and "L3+B" may be simultaneously created in two rows and one column in the downward direction similarly even with respect to two cells in a positive direction.

Figure 9A:
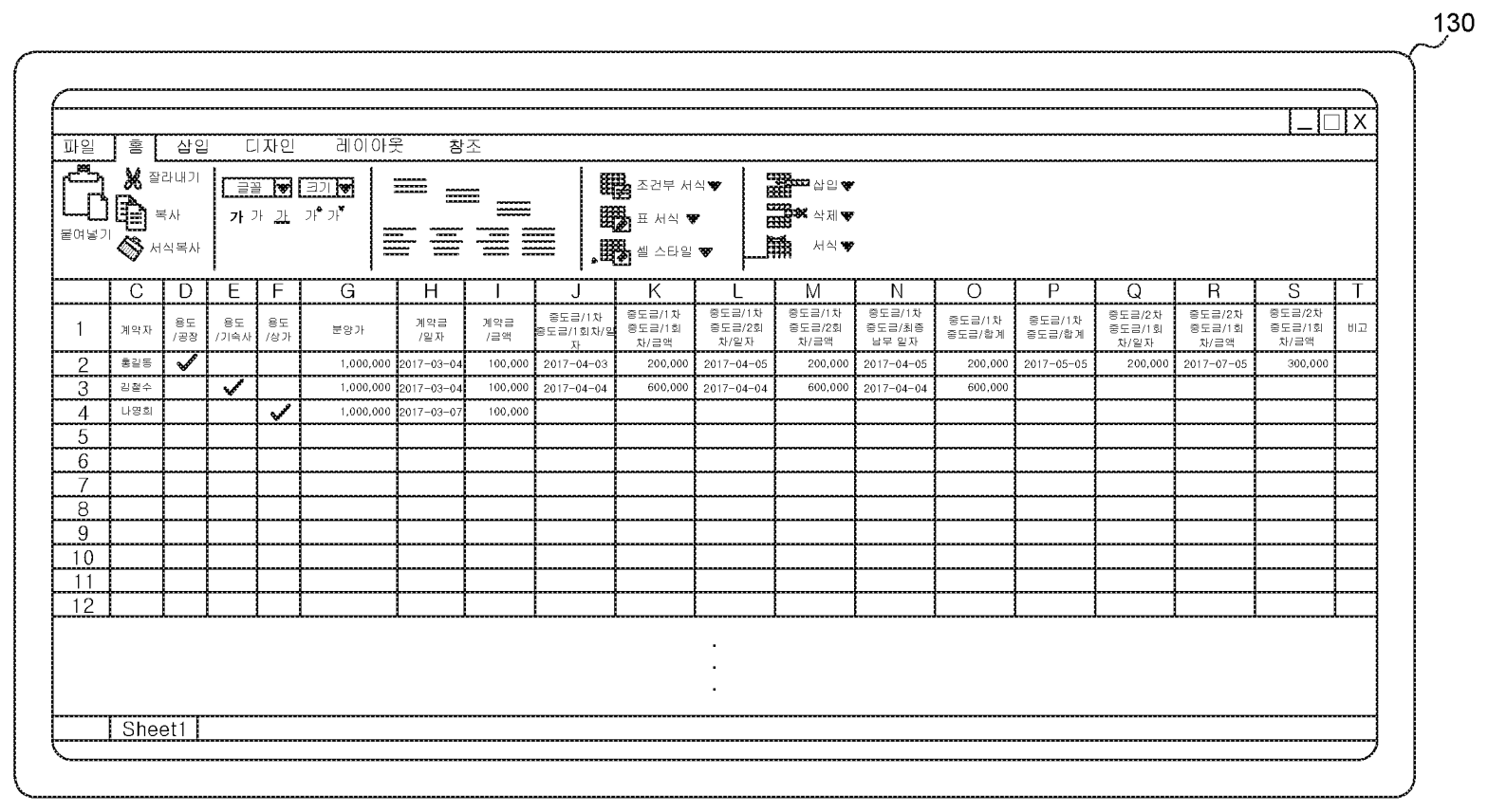
Figure 9B:
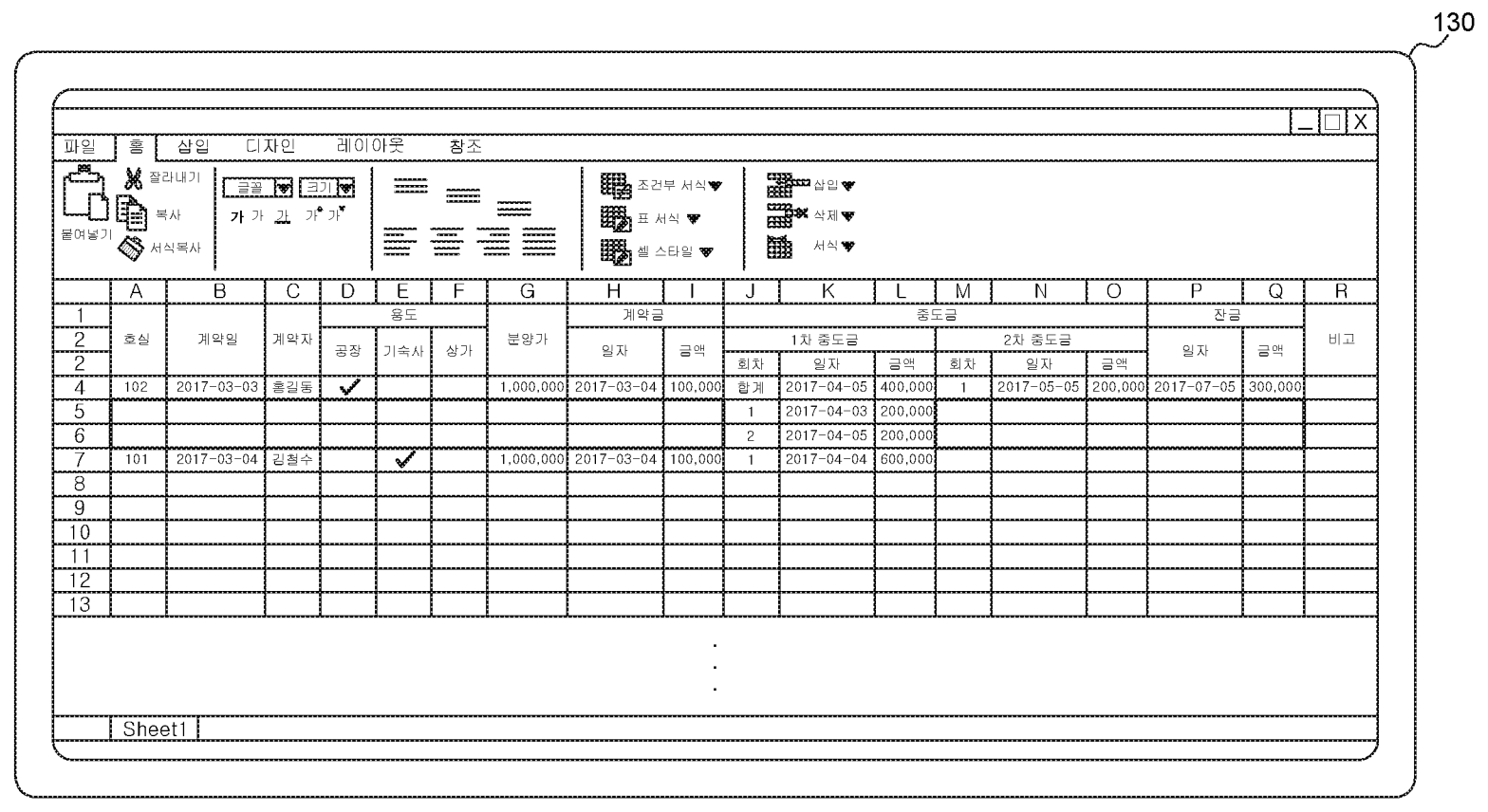

FIGS. 9A and 9B exemplarily illustrate a spreadsheet according to the related art. FIGS. 9A and 9B are diagrams for a case where a spreadsheet created by the method and the system 100 for processing the spreadsheet having multi-dimensional attributes according to the embodiment of the present disclosure as illustrated in FIG. 1A is created as the related art.

First, referring to FIG. 9A, in order to implement the spreadsheet illustrated in FIG. 1A as a spreadsheet according to the related art, a spreadsheet may be created in the same manner as the spreadsheet illustrated in FIG. 1A. That is, in the related art, data of each room is input in each row direction using a table form generally created in a spreadsheet, and detailed information of the corresponding room is input in each column direction.

However, in the case illustrated in FIG. 9A, when a row is additionally input by paying partially to the balance of the middle payment, that is, when the J5 cell and the J6 cell are created by the J4 cell lower cell indicating "the sum of the first middle payment", A5 cell to I6 cell which are lower cells created under J4 cell remain as an empty column. In this case, it is impossible to apply a unique function of a spreadsheet program such as data sorting or sum by cells remaining as the empty column.

As a result, as illustrated in FIG. 9B, a method of inputting data for each room in each row direction without duplication by applying a principle of the spreadsheet, and listing and inputting information on details of the corresponding room in each column direction (alphabet axis) without duplication is used.

When the spreadsheet is implemented as described above, the spreadsheet is applied to data sorting, a sum of each column, a pivot function, and the like, but it may be difficult for the user to recognize the data manifestly. In addition, the size of a table becomes very large, and it is a cumbersome to add a new field and correct data processing formulas such as pivot tables and sums when creating and modifying.

Accordingly, in the method and system 100 for processing the multi-dimensional spreadsheet according to the embodiment of the present disclosure, the created sub-cells are recognized as a separate lower cell from the upper cell existing in the spreadsheet. As a result, it is advantageous to apply commands of a document creation program such as a function of designating a range to parameters such as a filter, a pivot table, a mail merge, a partial sum, a sort, a rank function. Particularly, modifications are possible so as to use the multi-dimensional spreadsheet in conjunction with other programs such as a mail merge function of a word processor.

In addition, the method and the system 100 for processing the multi-dimensional spreadsheet may be configured to select a cell to create sub-cells among the plurality of cells constituting the spreadsheet, receive the sub-cell creation command input to the selected cell, and then display and output a multi-column field in a sub-cell form. Accordingly, in the method and the system 100 for processing the multi-dimensional spreadsheet, a user may easily display complex data in one table, easily perform complicated calculations, and use the data by interlocking with other programs.

Figure 10A:
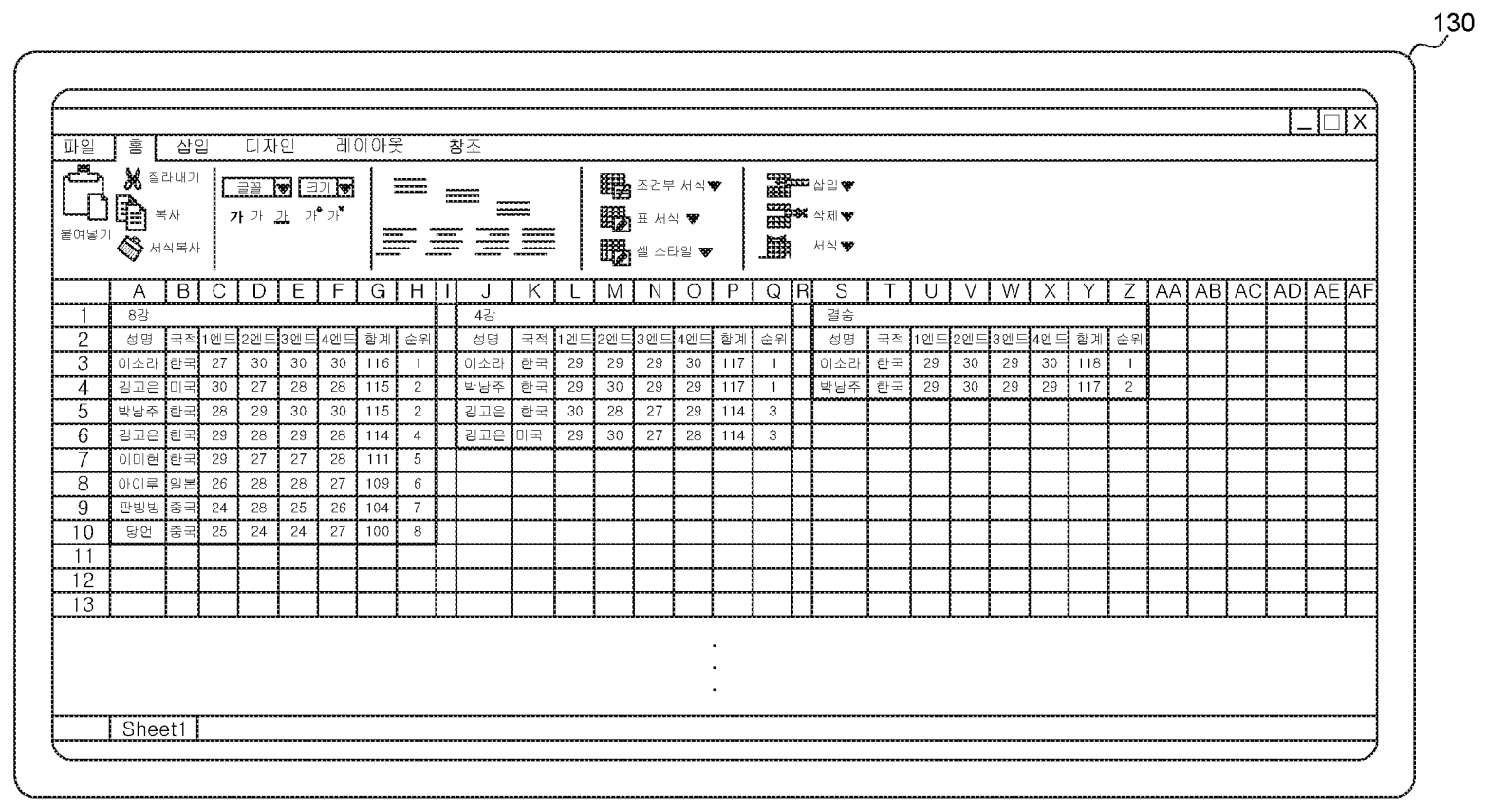
Figure 10B:
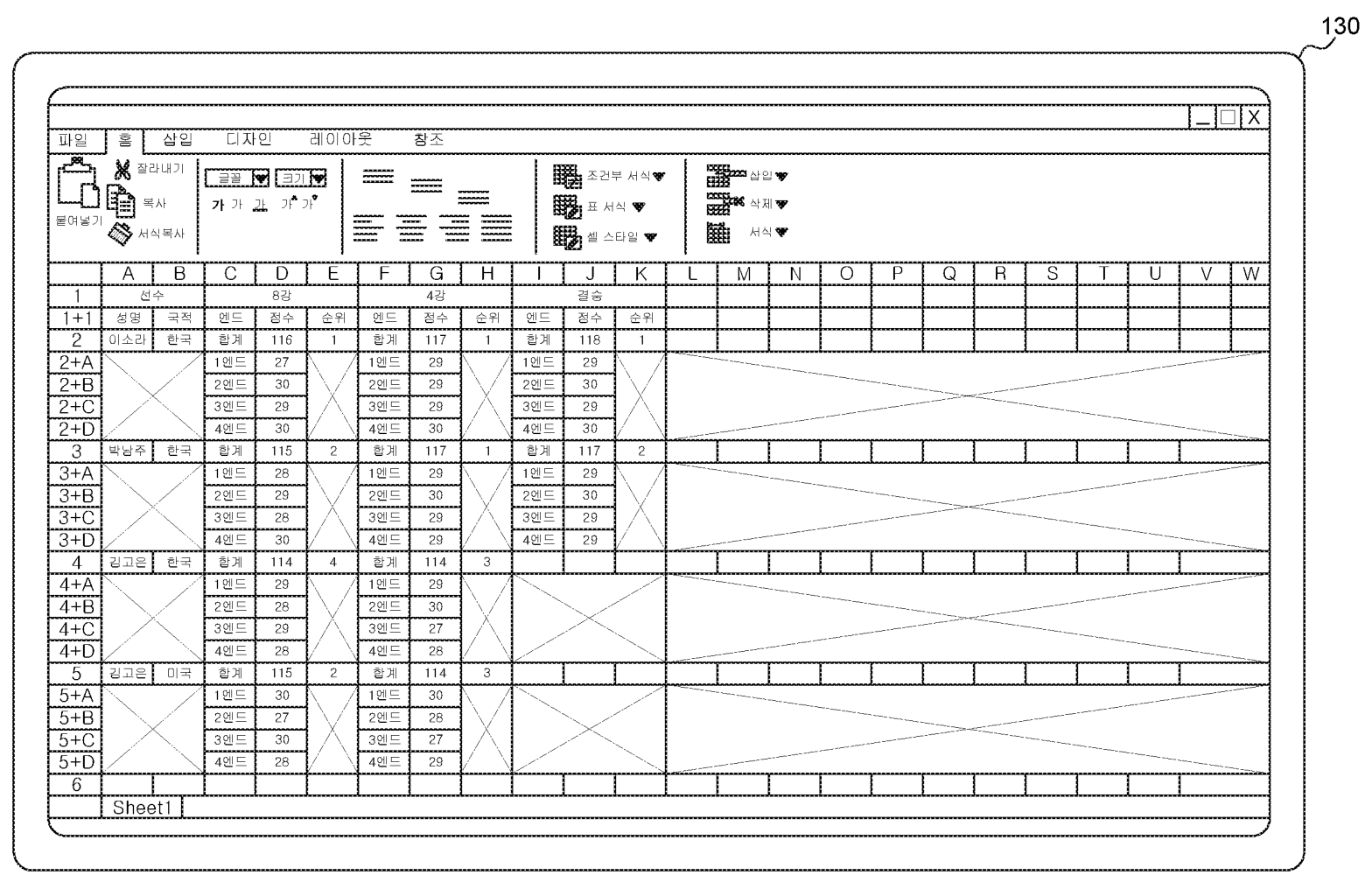

FIG. 10A exemplarily illustrates a spreadsheet according to the related art. FIG. 10B exemplarily illustrates a diagram for describing the spreadsheet created according to the method and the system for processing the multi-dimensional spreadsheet according to the embodiment of the present disclosure.

First, referring to FIG. 10A, a table of multiple fields such as a score is input on a spreadsheet for each tournament in the related art.

However, as illustrated in FIG. 10A, in the case of a table having empty spaces such as an I1 cell and an R1 cell between cells in which the "quarterfinal", "semifinal", and "final" are input as row names, it is impossible to apply a command to a spreadsheet program such as a function to designate a range to a parameter such as a sort, a partial sum, and a ranking function.

Then, as illustrated in FIG. 10B, a field of a table in which a sub-cell is created with "name" and "nationality" for each player in a row direction is input, and a field of a table in which a sub-cell is created with "end", 'score", and "rank" for each tournament in a column direction is input, and thus, it is possible to easily create a table constituted by multiple fields.

In the method and system 100 for processing a multi-dimensional spreadsheet according to the embodiment of the present disclosure as described above, by controlling the input of cells marked with an "X", when sub-cells dependent to a specific cell are created, there is an advantageous effect that it is possible to indicate that the sub-cell is dependent on the row number of the specific cell without marking the created row as the next row number or the previous row number of the row number of the specific cell. Here, the control of the input means that the input is automatically prohibited with respect to the cell marked as the "X".

Figure 11A:
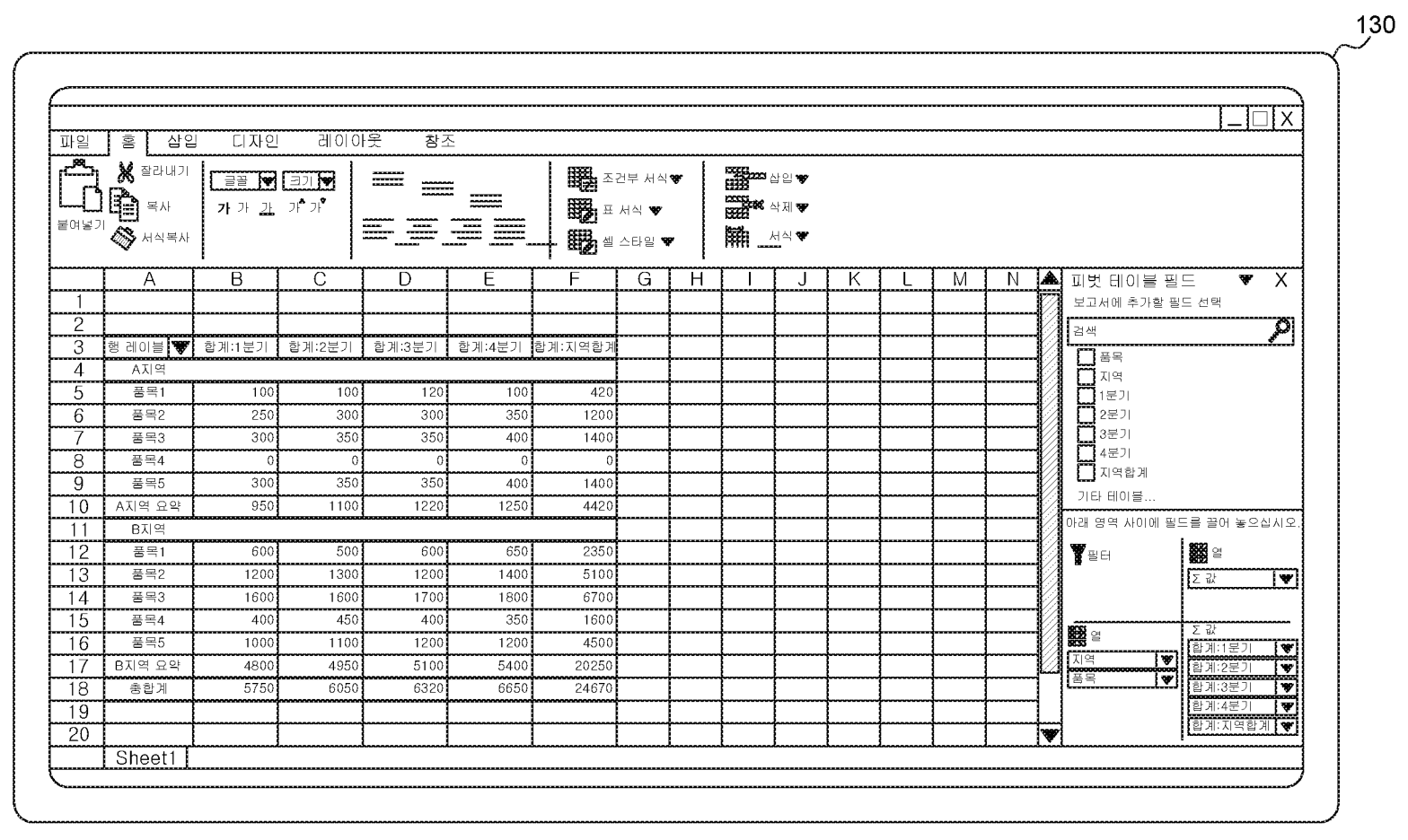
Figure 11B:
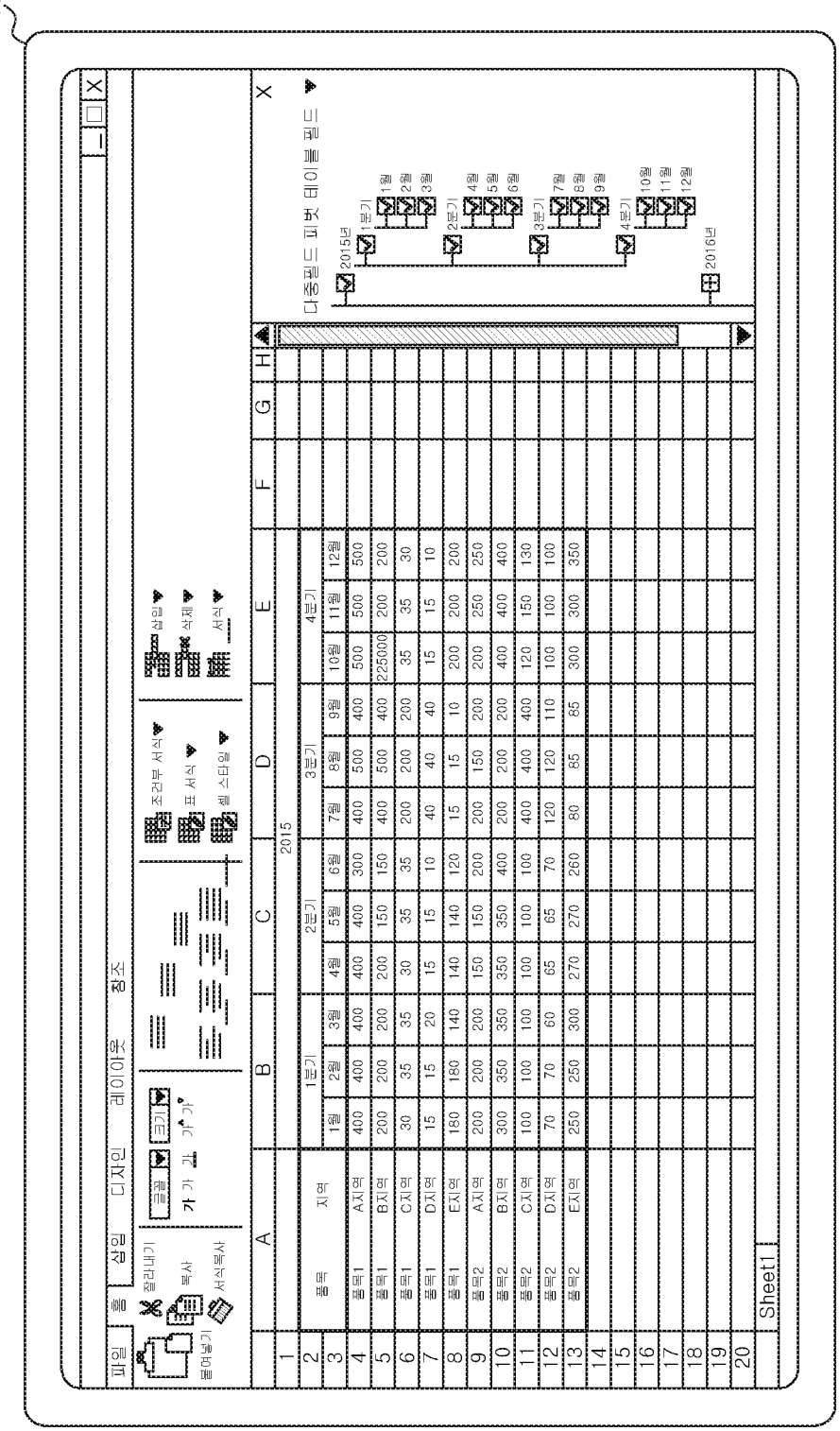
FIG. 11B exemplarily illustrates a spreadsheet created according to the method and the system for processing the multi-dimensional spreadsheet according to the embodiment of the present disclosure.

FIG. 11A exemplarily illustrates a spreadsheet according to the related art. FIG. 11B exemplarily illustrates a spreadsheet created according to the method and the system for processing the multi-dimensional spreadsheet according to the embodiment of the present disclosure.

First, referring to FIG. 11A, in the related art, in order to apply a pivot table according to the related art, fields to be set in columns, rows, and E values are input in a pivot table field, and then, as illustrated in FIG. 11A, items for each area are input in each row direction and quarterly items of the corresponding area are input in each column direction.

However, as illustrated in FIG. 11A, it is impossible to multiplex fields of a table to group the multiplexed fields.

Therefore, as illustrated in FIG. 11B, in order to simultaneously input items and regions in the A2 cell and simultaneously recognize data for each of the items and the regions, in the multi-field pivot table field, the year is divided into quarters and the field of the table is multiplexed so that the corresponding quarter further includes the corresponding month, thereby simply and intuitively and easily recognizing and managing the table as compared with the related art. Accordingly, when the pivot table field is selected, a plurality of data is displayed in the tree structure to be grouped and the plurality of data may be subjected to a depth expression and a selection.

In addition, as illustrated in FIG. 11B, the month corresponding to the quarter in each column direction is constituted by the sub-cells with respect to the quarter, and the fields of the multiplexed table are configured in each row direction, so that complicated data of several items are not duplicated, but may be clearly recognized.

In the method and the system 100 for processing a multi-dimensional spreadsheet according to an embodiment of the present disclosure described above, by setting the fields of the multiplexed table and the fields of the table constituted by the sub-cells as rows or columns, the pivot table of the multiple fields may be applied.

Figure 12A:
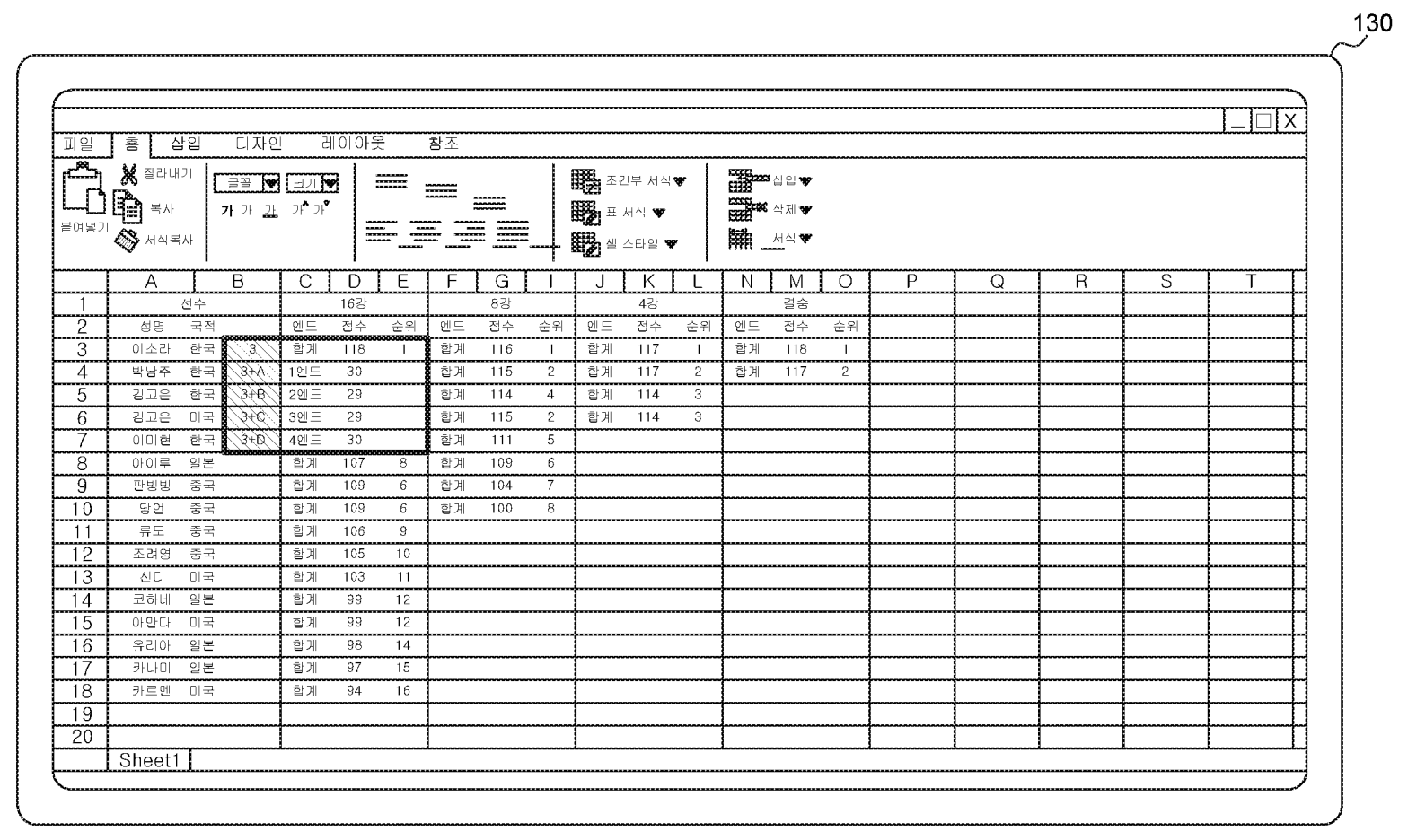

FIG. 12A exemplarily illustrates a sub sheet window by a method and a system for processing a multi-dimensional spreadsheet according to still yet another embodiment of the present disclosure. In the embodiment illustrated in FIG. 12A, since the sub-cell created by the sub-cell creation command is substantially the same as that of the embodiment described with reference to FIGS. 2 to 10b only except that the sub-cell is a pop-up type sub sheet window, the duplicated description will be omitted.

Referring to FIG. 12A, the sub-cell may further create the pop-up type sub sheet window. Specifically, referring to FIG. 12A, the B3 cell for creating the sub sheet window may be additionally created in an empty space between the B3 cell and the C3 cell in a table constituted by multiple fields.

Sub-cells "B3+A", "B3+B", "B3+C", and "B3+D" for the B3 cell may be created by selecting the B3 cell for creating the additionally created sub sheet window. At this time, it is possible to display the sub-cell for the selected cell "B3" as a new sub sheet window while retaining values of the cells previously input in the field of the table.

Referring to FIG. 12A, cells arranged in the same row as the B3 cell in the sub sheet window, that is, the cells located on the right side, indicate "end", "score", "rank" in each column direction with respect to a player Lee So-Ra having Korean nationality and scores of respective ends are simultaneously displayed in a column direction with respect to "end" and "score".

In the method and the system 100 for processing a multi-dimensional spreadsheet according to still yet another embodiment of the present disclosure as described above, the cells which are present in the created sub sheet window are recognized separately from the cells which are present in the spreadsheet, and as a result, the sub-cell may be displayed without changing the display of the row and column located in the field of the table. Further, the sub sheet window may be created, modified, and browsed by the commands of the user, that is, a menu input, a shortcut key, or the like as necessary.

Figure 12C:
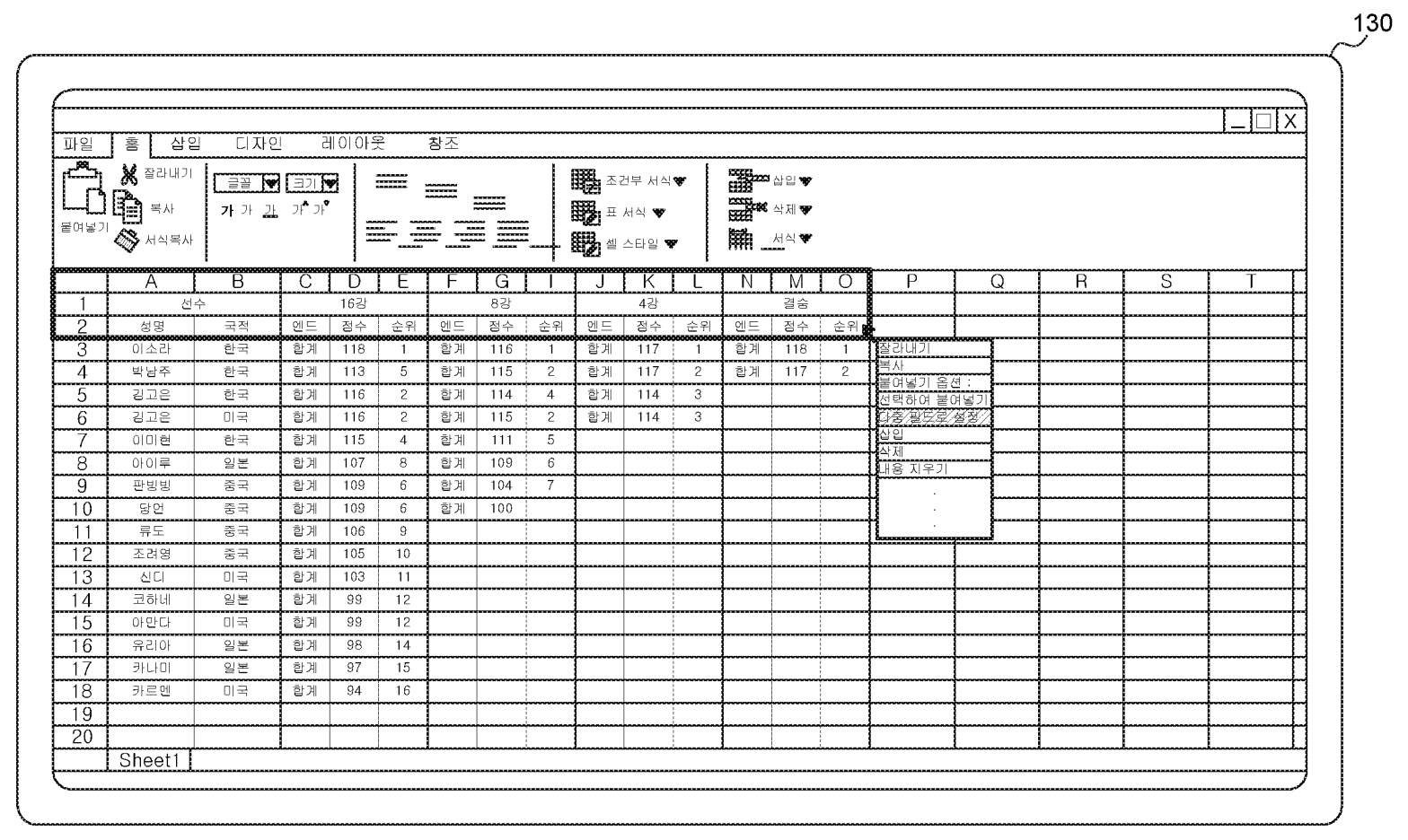

FIGS. 12B and 12C exemplarily illustrate a process of setting the multiple fields according to a method and a system for processing a multi-dimensional spreadsheet according to still yet another embodiment of the present disclosure. In the embodiment illustrated in FIGS. 12B and 12C, since a sub-cell creation command is substantially the same as that of the embodiment described with reference to FIGS. 2 to 10B only except that the sub-cell creation command is the menu input set by the multiple fields, the duplicated description will be omitted.

Referring to FIG. 12B, it is possible to display and output the multiple fields in a sub-cell format, as illustrated in FIG. 12C, by inputting a menu set by the multiple fields by designating multiple A1 cells to O2 cells. Accordingly, in the method and the system 100 for processing the multi-dimensional spreadsheet, a user may easily display complex data in one table, easily perform complicated calculations, and use the data by interlocking with other programs.

In the method and the system 100 for processing a multi-dimensional spreadsheet according to an embodiment of the present disclosure described above, a menu input of setting a lower cell input apart from an upper cell by the multiple fields is performed to automatically create the sub-cell having the tree structure at a time. The sub-cell having the tree structure is dependent on the upper cell to have a different depth.

In the present specification, each block or each process may represent a part of a module, a segment, or a code that includes one or more executable instructions for executing a specified logical function(s). It should also be noted that in some alternative embodiments, the functions mentioned in the blocks or processes may occur out of order. For example, two successive blocks or processes may, in fact, be performed substantially concurrently or the blocks or processes may sometimes be performed in reverse order according to the corresponding function.

The processes of a method or algorithm described in connection with the embodiments disclosed herein may be implemented directly in hardware, in a software module executed by a processor, or in a combination of the two. The software module may reside in a RAM memory, a flash memory, a ROM memory, an EPROM memory, an EEPROM memory, a register, an hard disk, a removable disk, a CD-ROM or any other form of storage medium known in the art. An exemplary storage medium is coupled to the processor, which is capable of reading information from, and writing information to, the storage medium. Alternatively, the storage medium may be integral with the processor. The processor and the storage medium may be included in the application specific integrated circuit (ASIC). The ASIC may reside within the user terminal. Alternatively, the processor and the storage medium may reside as discrete components in the user terminal.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A method for processing a multi-dimensional spreadsheet using a computer comprising one or more processors and system memory, the method comprising:
   receiving, by the one or more processors, a sub-cell creation command for at least one cell among a plurality of cells constituting a spreadsheet, wherein the spreadsheet comprises a plurality of columns and a plurality of rows, wherein the receiving the sub-cell creation command comprises receiving an input of a sub-cell creation function for the at least one cell, and wherein the sub-cell creation function comprises a function name, an axial direction parameter in which the sub-cells are created, a sub-row number parameter, and a sub-column number parameter;
   creating, using the one or more processors, sub-cells having a tree structure with respect to the at least one cell, wherein the sub-cells are defined on a different axis from the plurality of columns and the plurality of rows, and the sub-cells are placed in one or more sub-rows and two or more sub-columns under the at least one cell in the spreadsheet; and
   creating, using the one or more processors, two or more sub-columns in the column of the at least one cell, wherein the two or more sub-columns in the column of the at least one cell correspond to the two or more sub-columns of the sub-cells.

2. The method of claim 1, wherein the one or more sub-rows in which the sub-cells are created are indicated as being dependent on the row number of the at least one cell without being indicated as the next row number of the spreadsheet.

3. The method of claim 1, wherein the sub-cell creation function is configured to further include an additional cell number parameter additionally created in a row direction with respect to the created sub-cells.

4. The method of claim 1, wherein the sub-cell creation function is configured to further include a function data parameter indicating data to be input into the at least one cell or the sub-cells.

5. The method of claim 1, wherein the receiving of the sub-cell creation command further includes receiving a menu input corresponding to the sub-cells.

6. The method of claim 1, wherein the receiving of the sub-cell creation command further includes receiving a menu input for selecting the plurality of cells to intend to create the sub-cells having the tree structure and setting the selected cells as multiple fields.

7. The method of claim 1, wherein the receiving of the sub-cell creation command further includes creating a sub sheet window for the at least one cell.

8. The method of claim 7, wherein the sub sheet window is a window that displays the sub-cells for the at least one cell apart from the spreadsheet.

9. The method of claim 1, further comprising:
controlling an input of the same row as the sub-cells.

10. The method of claim 9, wherein the controlling of the input of the same row as the sub-cells is prohibiting an input for a cell disposed in the same row as the sub-cells.

11. The method of claim 9, further comprising:
displaying control for the input of the same row as the sub-cells having the tree structure.

12. The method of claim 11, wherein the prohibiting of the input for the cell disposed in the same row as the sub-cells includes displaying a content that the input for the cell disposed in the same row as the sub-cells is prohibited.

13. The method of claim 1, wherein the one or more sub-columns in the column of the at least one cell are created at rows below the row of the at least one cell.

14. A computer-readable recording medium storing commands providing a method for processing a multi-dimensional spreadsheet, wherein the method includes:
receiving a sub-cell creation command for at least one cell among a plurality of cells constituting a spreadsheet, wherein the spreadsheet comprises a plurality of columns and a plurality of rows, wherein the receiving the sub-cell creation command comprises receiving an input of a sub-cell creation function for the at least one cell, and wherein the sub-cell creation function comprises a function name, an axial direction parameter in which the sub-cells are created, a sub-row number parameter, and a sub-column number parameter;

creating sub-cells having a tree structure with respect to the at least one cell, wherein the sub-cells are defined on a different axis from the plurality of columns and the plurality of rows, and the sub-cells are placed in one or more sub-rows and two or more sub-columns under the at least one cell in the spreadsheet; and
creating two or more sub-columns in the column of the at least one cell, wherein the two or more sub-columns in the column of the at least one cell correspond to the two or more sub-columns of the sub-cells.

15. A system for processing a multi-dimensional spreadsheet, the system comprising:
a receiving unit configured to receive a sub-cell creation command for at least one cell among a plurality of cells constituting a spreadsheet, wherein the spreadsheet comprises a plurality of columns and a plurality of rows, wherein the receiving the sub-cell creation command comprises receiving an input of a sub-cell creation function for the at least one cell, and wherein the sub-cell creation function comprises a function name, an axial direction parameter in which the sub-cells are created, a sub-row number parameter, and a sub-column number parameter; and
a processing unit configured to:
create sub-cells having a tree structure with respect to the at least one cell according to the sub-cell creation command, wherein the sub-cells are defined on a different axis from the plurality of columns and the plurality of rows, and the sub-cells are placed in one or more sub-rows and two or more sub-columns under the at least one cell in the spreadsheet; and
create two or more sub-columns in the column of the at least one cell, wherein the two or more sub-columns in the column of the at least one cell correspond to the two or more sub-columns of the sub-cells.

16. The system of claim 15, wherein the receiving unit is further configured to receive a menu input corresponding to sub-cells.

17. The system of claim 15, wherein the receiving unit is further configured to receive a signal for controlling an input of the same row as the sub-cells.

* * * * *